United States Patent
Kamatani

(10) Patent No.: US 12,240,454 B2
(45) Date of Patent: Mar. 4, 2025

(54) VEHICLE DRIVING ASSIST APPARATUS, VEHICLE DRIVING ASSIST METHOD, VEHICLE DRIVING ASSIST PROGRAM, AND VEHICLE COMPRISING VEHICLE DRIVING ASSIST APPARATUS

(71) Applicant: TOYOTA JIDOSHA KABUSHIKI KAISHA, Toyota (JP)

(72) Inventor: Hideki Kamatani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/974,659

(22) Filed: Oct. 27, 2022

(65) Prior Publication Data
US 2023/0145836 A1 May 11, 2023

(30) Foreign Application Priority Data
Nov. 10, 2021 (JP) .................................. 2021-182973

(51) Int. Cl.
| | |
|---|---|
| *B60W 30/16* | (2020.01) |
| *B60W 10/04* | (2006.01) |
| *B60W 10/18* | (2012.01) |
| *B60W 20/16* | (2016.01) |
| *B60W 30/14* | (2006.01) |
| *B60W 30/18* | (2012.01) |
| *B60W 50/08* | (2020.01) |
| *B60W 50/10* | (2012.01) |

(52) U.S. Cl.
CPC ............ *B60W 30/16* (2013.01); *B60W 10/04* (2013.01); *B60W 10/18* (2013.01); *B60W 20/16* (2016.01); *B60W 30/146* (2013.01); *B60W 30/18072* (2013.01); *B60W 50/082* (2013.01); *B60W 50/10* (2013.01); *B60W 2030/1809* (2013.01); *B60W 2520/10* (2013.01); *B60W 2540/10* (2013.01); *B60W 2720/10* (2013.01); *B60W 2720/106* (2013.01); *B60W 2754/30* (2020.02)

(58) Field of Classification Search
None
See application file for complete search history.

(56) References Cited

U.S. PATENT DOCUMENTS

| | | | | |
|---|---|---|---|---|
| RE37,434 E | * | 11/2001 | Onari | .................... B60W 10/18 701/110 |
| 8,355,851 B2 | | 1/2013 | Inoue et al. | |

(Continued)

FOREIGN PATENT DOCUMENTS

| | | | | |
|---|---|---|---|---|
| BR | 102016011097 A2 | * | 11/2016 | ............ B60W 10/02 |
| BR | 102016011097 B1 | * | 11/2022 | ............ B60W 10/02 |

(Continued)

*Primary Examiner* — Kevin R Steckbauer
(74) *Attorney, Agent, or Firm* — Sughrue Mion, PLLC

(57) ABSTRACT

While an ordinary moving assist control is executed, a vehicle driving assist apparatus stops the ordinary moving assist control and execute an ordinary moving control to accelerate an own vehicle, based on an accelerator pedal operation amount when an accelerator override state is produced due to an operation of an accelerator pedal of the own vehicle. While an economy moving assist control is executed, the vehicle driving assist apparatus accelerates the own vehicle by an optimum acceleration control when an acceleration request condition that the accelerator override state is produced, is satisfied.

10 Claims, 11 Drawing Sheets

(56) References Cited

U.S. PATENT DOCUMENTS

| | | | |
|---|---|---|---|
| 8,370,040 B2 | 2/2013 | Inoue et al. | |
| 8,417,430 B2 | 4/2013 | Saeki | |
| 8,521,379 B2 * | 8/2013 | Wurthner | B60W 30/18072 701/55 |
| 8,548,709 B2 | 10/2013 | Morita | |
| 8,768,597 B2 | 7/2014 | Kagawa | |
| 9,174,643 B2 | 11/2015 | Aso | |
| 9,725,083 B2 * | 8/2017 | Dextreit | B60W 20/00 |
| 10,017,178 B2 | 7/2018 | Morimoto et al. | |
| 10,040,454 B2 * | 8/2018 | De Smet | F01N 3/0814 |
| 10,118,617 B2 | 11/2018 | Urano et al. | |
| 10,259,445 B2 * | 4/2019 | Dextreit | B60W 20/00 |
| 10,464,548 B2 * | 11/2019 | Eo | B60W 30/143 |
| 10,486,698 B2 | 11/2019 | Masui et al. | |
| 10,605,356 B2 * | 3/2020 | Kook | F16H 61/0213 |
| 10,752,245 B2 * | 8/2020 | Eo | B60W 10/08 |
| 11,491,983 B1 * | 11/2022 | Sun | B60W 40/06 |
| 11,505,188 B2 * | 11/2022 | Fujimaki | B60W 30/143 |
| 11,718,298 B2 * | 8/2023 | Gupta | B60W 40/105 701/70 |
| 11,897,470 B2 * | 2/2024 | Jeon | B60W 10/06 |
| 12,000,706 B2 * | 6/2024 | Salako | G06Q 10/047 |
| 2011/0276216 A1 * | 11/2011 | Vaughan | B60W 30/143 701/31.4 |
| 2015/0134224 A1 * | 5/2015 | Vaughan | B60W 30/143 701/93 |
| 2015/0314771 A1 * | 11/2015 | Dextreit | B60W 10/08 180/65.265 |
| 2017/0008468 A1 * | 1/2017 | Lindhuber | B60L 15/2045 |
| 2017/0008525 A1 * | 1/2017 | Ko | B60W 40/076 |
| 2017/0021831 A1 * | 1/2017 | De Smet | B60K 31/00 |
| 2017/0305406 A1 * | 10/2017 | Dextreit | B60W 20/10 |
| 2018/0065620 A1 * | 3/2018 | Eo | B60W 20/40 |
| 2018/0162397 A1 * | 6/2018 | Eo | B60W 30/182 |
| 2019/0257415 A1 * | 8/2019 | Kook | F16H 61/0213 |
| 2019/0295419 A1 | 9/2019 | Tosa et al. | |
| 2021/0362713 A1 * | 11/2021 | Fujimaki | B60W 30/18163 |
| 2022/0118980 A1 * | 4/2022 | Gupta | B60W 40/105 |
| 2022/0153269 A1 * | 5/2022 | Jeon | B60W 30/14 |
| 2022/0185280 A1 * | 6/2022 | Kamatani | B60W 30/146 |
| 2022/0306111 A1 * | 9/2022 | Kuroki | B60W 30/143 |
| 2023/0044965 A1 * | 2/2023 | Whang | B60W 50/082 |
| 2023/0098792 A1 * | 3/2023 | Kamatani | B60W 30/16 701/96 |
| 2023/0145836 A1 * | 5/2023 | Kamatani | B60W 50/10 701/70 |
| 2023/0182737 A1 * | 6/2023 | Hwang | B60W 30/143 701/70 |
| 2023/0234587 A1 * | 7/2023 | Ito | B60K 31/0008 701/96 |
| 2023/0286505 A1 * | 9/2023 | Kamatani | B60W 30/18163 |
| 2024/0035837 A1 * | 2/2024 | Salako | H04L 67/535 |
| 2024/0123969 A1 * | 4/2024 | Kamatani | B60W 40/06 |
| 2024/0132069 A1 * | 4/2024 | Kamatani | B60W 30/18072 |
| 2024/0132072 A1 * | 4/2024 | Kamatani | B60W 30/18072 |
| 2024/0132073 A1 * | 4/2024 | Kamatani | F02D 41/065 |
| 2024/0190430 A1 * | 6/2024 | Kamatani | B60W 30/143 |
| 2024/0199055 A1 * | 6/2024 | Higuchi | B60W 30/18072 |
| 2024/0227801 A9 * | 7/2024 | Kamatani | B60W 30/16 |
| 2024/0227806 A9 * | 7/2024 | Kamatani | B60W 30/18072 |
| 2024/0227807 A9 * | 7/2024 | Kamatani | B60W 60/001 |
| 2024/0239339 A1 * | 7/2024 | Kamatani | B60W 30/143 |
| 2024/0253632 A1 * | 8/2024 | Kamatani | B60W 30/182 |

FOREIGN PATENT DOCUMENTS

| | | | | |
|---|---|---|---|---|
| CN | 100418805 C | * | 9/2008 | B60K 31/04 |
| CN | 105035084 A | * | 11/2015 | B60K 31/00 |
| CN | 106368776 A | * | 2/2017 | B60K 31/00 |
| CN | 108162951 A | * | 6/2018 | B60L 15/20 |
| CN | 106368776 B | * | 7/2020 | B60K 31/00 |
| CN | 114516330 A | * | 5/2022 | B60W 10/02 |
| DE | 102012013689 A1 | * | 1/2014 | B60T 7/12 |
| DE | 102017126427 A1 | * | 6/2018 | B60L 15/20 |
| DE | 102020210368 A1 | * | 2/2022 | |
| DE | 102017126427 B4 | * | 8/2022 | B60L 15/20 |
| DE | 102016226128 B4 | * | 10/2023 | B60K 6/22 |
| DE | 102023134297 A1 | * | 6/2024 | B60W 30/143 |
| EP | 2219092 A1 | * | 8/2010 | B60W 30/146 |
| EP | 2219092 B1 | * | 9/2011 | B60W 30/146 |
| EP | 2928748 B1 | * | 7/2021 | B60K 6/48 |
| FR | 3017586 A1 | * | 8/2015 | B60K 31/04 |
| GB | 2508669 A | * | 6/2014 | B60K 6/48 |
| GB | 2511899 A | * | 9/2014 | B60K 6/48 |
| JP | 2017-193334 A | | 10/2017 | |
| JP | 2022114062 A | * | 8/2022 | |
| JP | 2023070709 A | * | 5/2023 | B60W 10/04 |
| JP | 7494830 B2 | * | 6/2024 | B60W 10/04 |
| JP | 2024082606 A | * | 6/2024 | B60W 30/143 |
| WO | WO-2014090825 A2 | * | 6/2014 | B60K 6/48 |

* cited by examiner

VEHICLE DRIVING ASSIST APPARATUS, VEHICLE DRIVING ASSIST METHOD, VEHICLE DRIVING ASSIST PROGRAM, AND VEHICLE COMPRISING VEHICLE DRIVING ASSIST APPARATUS

CROSS-REFERENCE TO RELATED APPLICATIONS

This application claims priority to Japanese patent application No. JP 2021-182973 filed on Nov. 10, 2021, the content of which is hereby incorporated by reference in its entirety.

BACKGROUND

Field

The invention relates to a vehicle driving assist apparatus, a vehicle driving assist method, a vehicle driving assist program, and a vehicle comprising the vehicle driving assist apparatus

Description of the Related Art

There is known a vehicle driving assist apparatus which decelerates an own vehicle by causing the own vehicle to coast by a moving assist control or an autonomous driving control or an automatic driving control which autonomously accelerates and decelerates the own vehicle so as to maintain a moving speed of the own vehicle in a predetermined speed range (for example, see JP 2017-193334 A).

There is also known a technique to (i) determine that an accelerator override state is produced due to an accelerator pedal being operated while the moving assist control is executed, (ii) temporarily stop the moving assist control, and (iii) accelerate the own vehicle, depending on an operation amount of the accelerator pedal. Thereby, the own vehicle stops coasting and is accelerated. Thus, a power output efficiency of a driving apparatus of the own vehicle (i.e., an energy efficiency at which the driving apparatus outputs power) is reduced. If the moving assist control continues to be executed even when the accelerator override state is produced, a reduction of the power output efficiency of the driving apparatus of the own vehicle can be avoided. However, a request of the driver to accelerate the own vehicle is not met.

SUMMARY

An object of the invention is to provide a vehicle driving assist apparatus which meets the request of the driver to accelerate the own vehicle, limiting the reduction of the power output efficiency of the driving apparatus of the own vehicle when the accelerator override state is produced while the moving assist control is executed.

According to the invention, a vehicle driving assist apparatus comprises an electronic control unit configured to execute an ordinary moving assist control and an economy moving assist control. The ordinary moving assist control is a control to autonomously accelerate and decelerate an own vehicle so as to maintain a moving speed of the own vehicle at a set speed, or maintain a distance between the own vehicle and a preceding vehicle which moves ahead of the own vehicle at a set distance. The economy moving assist control is a control to autonomously accelerate and decelerate the own vehicle so as to maintain the moving speed of the own vehicle within a predetermined speed range, or maintain the distance between the own vehicle and the preceding vehicle within a predetermined forward distance range.

While the economy moving assist control is executed, the electronic control unit is configured to execute (i) a coasting control to decelerate the own vehicle by causing the own vehicle to coast and (ii) an optimum acceleration control to accelerate the own vehicle by controlling operations of a driving apparatus of the own vehicle at a power output efficiency of the driving apparatus equal to or greater than a predetermined efficiency.

While the ordinary moving assist control is executed, the electronic control unit is configured to stop the ordinary moving assist control and execute an ordinary moving control to accelerate the own vehicle, based on an accelerator pedal operation amount when an accelerator override state is produced due to an operation of an accelerator pedal of the own vehicle.

In addition, the electronic control unit is configured to accelerate the own vehicle by the optimum acceleration control when an acceleration request condition that the accelerator override state is produced, is satisfied while the economy moving assist control is executed.

With the vehicle driving assist apparatus according to the invention, the own vehicle is accelerated by controlling the operations of the driving apparatus so as to maintain the power output efficiency of the driving apparatus at the efficiency equal to or greater than the predetermined efficiency when the accelerator override state is produced while the economy moving assist control is executed. Thus, the request of the driver to accelerate the own vehicle can be met. In addition, the power output efficiency of the driving apparatus can be maintained at the efficiency equal to or greater than the predetermined efficiency and thus, the reduction of the power output efficiency of the driving apparatus of the own vehicle can be limited.

According to an aspect of the invention, the acceleration request condition may include a condition that the moving speed of the own vehicle is within the predetermined speed range.

If the own vehicle is accelerated when the economy moving assist control is executed, and the moving speed of the own vehicle is not within the predetermined speed range, the moving speed of the own vehicle cannot be maintained within a limited speed range. With the vehicle driving assist apparatus according to this aspect of the invention, the acceleration request condition includes the condition that the moving speed of the own vehicle is within the predetermined speed range while the economy moving assist control is executed. Thus, the moving speed of the own vehicle can be maintained within the limited speed range.

According to another aspect of the invention, the acceleration request condition may include a condition that the distance between the own vehicle and the preceding vehicle is within the predetermined forward distance range.

If the own vehicle is accelerated when the economy moving assist control is executed, and the distance between the own vehicle and the preceding vehicle is not within the predetermined forward distance range, the distance between the own vehicle and the preceding vehicle cannot be maintained within a limited distance range. With the vehicle driving assist apparatus according to this aspect of the invention, the acceleration request condition includes the condition that the distance between the own vehicle and the preceding vehicle is within the predetermined forward distance range. Thus, the distance between the own vehicle and the preceding vehicle can be maintained within the limited distance range.

According to further another aspect of the invention, the electronic control unit may be configured to maintain a distance between the own vehicle and a following vehicle which moves behind the own vehicle within a predetermined rearward distance range by the economy moving assist control. In this aspect, the acceleration request condition may include a condition that the distance between the own vehicle and the following vehicle is within the predetermined rearward distance range.

When there is the following vehicle, and the economy moving assist control is executed, the distance between the own vehicle and the following vehicle is desirably maintained within a limited distance range. With the vehicle driving assist apparatus according to this aspect of the invention, the acceleration request condition includes the condition that the distance between the own vehicle and the following vehicle is within the predetermined rearward distance range when the economy moving assist control is executed. Thus, the distance between the own vehicle and the following vehicle can be maintained within the limited distance range.

According to further another aspect of the invention, two power sources having different power output properties may be installed on the own vehicle. In this aspect, the electronic control unit may be configured to stop operating at least one of the power sources when the coasting control is executed. In this aspect, the acceleration request condition may include a condition that the unoperated power source will be operated when the own vehicle is accelerated by the ordinary moving control, based on the accelerator pedal operation amount.

If the own vehicle is accelerated by changing the coasting control to the optimum acceleration control when the unoperated power source will be operated to accelerate the own vehicle by the ordinary moving control in response to the accelerator pedal being operated while the coasting control is executed, the own vehicle is accelerated by the optimum acceleration control, not by the ordinary moving control. Thus, the power output efficiency is increased. With the vehicle driving assist apparatus according to this aspect of the invention, the acceleration request condition includes the condition that the unoperated power source will be operated when the own vehicle is accelerated by the ordinary moving control, based on the accelerator pedal operation amount. Thus, the power output efficiency can be maintained at the great efficiency.

According to the invention, a vehicle driving assist method comprises a step of executing an ordinary moving assist control to autonomously accelerate and decelerate an own vehicle so as to maintain a moving speed of the own vehicle at a set speed, or maintain a distance between the own vehicle and a preceding vehicle which moves ahead of the own vehicle at a set distance. The vehicle driving assist method comprises a step of executing an economy moving assist control to autonomously accelerate and decelerate the own vehicle so as to maintain the moving speed of the own vehicle within a predetermined speed range, or maintain the distance between the own vehicle and the preceding vehicle within a predetermined forward distance range. The vehicle driving assist method comprises a step of, while the economy moving assist control is executed, executing a coasting control to decelerate the own vehicle by causing the own vehicle to coast and an optimum acceleration control to accelerate the own vehicle by controlling operations of a driving apparatus of the own vehicle at a power output efficiency of the driving apparatus equal to or greater than a predetermined efficiency. The vehicle driving assist method comprises a step of, while the ordinary moving assist control is executed, stopping the ordinary moving assist control and executing an ordinary moving control to accelerate the own vehicle, based on an accelerator pedal operation amount when an accelerator override state is produced due to an operation of an accelerator pedal of the own vehicle. The vehicle driving assist method comprises a step of accelerating the own vehicle by the optimum acceleration control when an acceleration request condition that the accelerator override state is produced, is satisfied while the economy moving assist control is executed.

With the vehicle driving assist method of the invention, for the reasons described above, the request of the driver to accelerate the own vehicle can be met, and the reduction of the power output efficiency of the driving apparatus of the own vehicle can be limited.

According to the invention, a vehicle driving assist program is configured to execute an ordinary moving assist control to autonomously accelerate and decelerate an own vehicle so as to maintain a moving speed of the own vehicle at a set speed, or maintain a distance between the own vehicle and a preceding vehicle which moves ahead of the own vehicle at a set distance. The vehicle driving assist program is configured to execute an economy moving assist control to autonomously accelerate and decelerate the own vehicle so as to maintain the moving speed of the own vehicle within a predetermined speed range, or maintain the distance between the own vehicle and the preceding vehicle within a predetermined forward distance range. The vehicle driving assist program is configured to, while the economy moving assist control is executed, execute a coasting control to decelerate the own vehicle by causing the own vehicle to coast and an optimum acceleration control to accelerate the own vehicle by controlling operations of a driving apparatus of the own vehicle at a power output efficiency of the driving apparatus equal to or greater than a predetermined efficiency. The vehicle driving assist program is configured to, while the ordinary moving assist control is executed, stop the ordinary moving assist control and execute an ordinary moving control to accelerate the own vehicle, based on an accelerator pedal operation amount when an accelerator override state is produced due to an operation of an accelerator pedal of the own vehicle. The vehicle driving assist program is configured to accelerate the own vehicle by the optimum acceleration control when an acceleration request condition that the accelerator override state is produced, is satisfied while the economy moving assist control is executed.

With the vehicle driving assist program of the invention, for the reasons described above, the request of the driver to accelerate the own vehicle can be met, and the reduction of the power output efficiency of the driving apparatus of the own vehicle can be limited.

According to the invention, a vehicle comprises the vehicle driving assist apparatus of the invention. Further, a vehicle comprises a vehicle driving assist apparatus executing the vehicle driving assist method of the invention. Furthermore, a vehicle comprises a vehicle driving assist apparatus executing the vehicle driving assist program of the invention.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
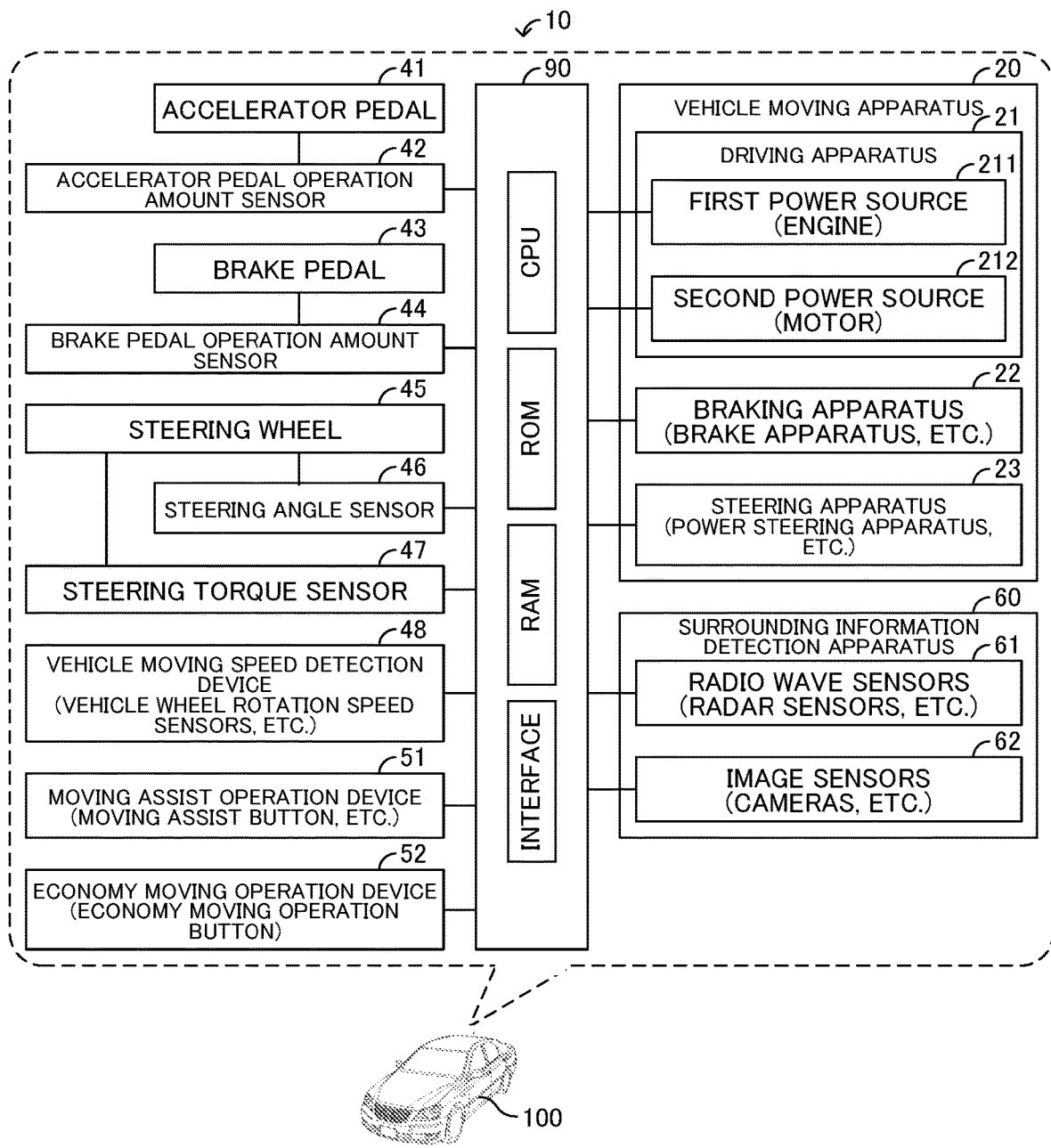
FIG. 1 is a view which shows a vehicle driving assist apparatus according to an embodiment of the invention and a vehicle or an own vehicle installed with the vehicle driving assist apparatus.

Below, a vehicle driving assist apparatus according to an embodiment of the invention will be described with reference to the drawings. FIG. 1 shows the vehicle driving assist apparatus 10 according to the embodiment of the invention. The vehicle driving assist apparatus 10 is installed on an own vehicle 100.

<ECU>

The vehicle driving assist apparatus 10 includes an ECU 90 as a control device. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM. In particular, the ROM stores a vehicle driving assist program which executes a driving assist control described later in detail. The CPU is configured or programmed to execute the driving assist control by executing the vehicle driving assist program.

In particular, the ECU 90 has stored a program executing a moving assist control described later in detail in the ROM. In this regard, the ECU 90 may be configured or programmed to acquire and store such a program via a receiving device wirelessly from a device outside of the own vehicle 100. Alternatively, the ECU 90 may be configured or programmed to update the stored program via the receiving device wirelessly by the device outside of the own vehicle 100.

<Vehicle Moving Apparatus>

The own vehicle 100 is installed with a vehicle moving apparatus 20. The vehicle moving apparatus 20 is an apparatus which drives, brakes, and steers the own vehicle 100. In this embodiment, the vehicle moving apparatus 20 includes a driving apparatus 21, a braking apparatus 22, and a steering apparatus 23.

<Driving Apparatus>

The driving apparatus 21 is an apparatus which outputs a driving force or a driving torque to be applied to the own vehicle 100 to move the own vehicle 100. In this embodiment, the driving apparatus 21 includes two power sources, i.e., a first power source 211 and a second power source 212 which have different power output properties. The first power source 211 may be an internal combustion engine, and the second power source 212 may be at least one electric motor. The first power source 211 and the second power source 212 are electrically connected to the ECU 90. The ECU 90 controls the driving force or the driving torque output from the first power source 211 and the second power source 212 by controlling operations of the first power source 211 and the second power source 212.

<Braking Apparatus>

The braking apparatus 22 is an apparatus which outputs a braking force or a braking torque to be applied to the own vehicle 100 so as to brake the own vehicle 100. The braking apparatus 22 may be a hydraulic brake apparatus. The braking apparatus 22 is electrically connected to the ECU 90. The ECU 90 controls the braking force or the braking torque output from the braking apparatus 22 by controlling operations of the braking apparatus 22.

<Steering Apparatus>

The steering apparatus 23 is an apparatus which outputs a steering force or a steering torque to be applied to the own vehicle 100 to steer the own vehicle 100. The steering apparatus 23 may be a power steering apparatus. The steering apparatus 23 is electrically connected to the ECU 90. The ECU 90 controls the steering force or the steering torque output from the steering apparatus 23 by controlling operations of the steering apparatus 23.

<Sensors, Etc.>

Further, the own vehicle 100 is installed with an accelerator pedal 41, an accelerator pedal operation amount sensor 42, a brake pedal 43, a brake pedal operation amount sensor 44, a steering wheel 45, a steering angle sensor 46, a steering torque sensor 47, a vehicle moving speed detection device 48, a moving assist operation device 51, an economy moving operation device 52, and a surrounding information detection apparatus 60.

<Accelerator Pedal Operation Amount Sensor>

The accelerator pedal operation amount sensor 42 is a sensor which detects an operation amount of the accelerator pedal 41. The accelerator pedal operation amount sensor 42 is electrically connected to the ECU 90. The accelerator pedal operation amount sensor 42 sends information on the detected operation amount to the ECU 90. The ECU 90 acquires the operation amount of the accelerator pedal 41 as an accelerator pedal operation amount AP, based on the information sent from the accelerator pedal operation amount sensor 42.

The ECU 90 calculates and acquires the driving torque to be output from the driving apparatus 21 as a driver requested driving torque DTQ_D_RQ, based on the accelerator pedal operation amount AP and a moving speed of the own vehicle 100, i.e., an own vehicle moving speed when the ECU 90 does not execute the moving assist control described later in detail. The ECU 90 controls the operations of the driving apparatus 21 so as to output the driving torque corresponding to the driver requested driving torque DTQ_D_RQ. On the other hand, when the ECU 90 executes the moving assist control, the ECU 90 determines the driving torque necessary to move the own vehicle 100 by the moving assist control as desired as a system requested driving torque DTQ_S_RQ. Then, the ECU 90 controls the operations of the driving apparatus 21 so as to output the driving torque corresponding to the system requested driving torque DTQ_S_RQ.

<Brake Pedal Operation Amount Sensor>

The brake pedal operation amount sensor 44 is a sensor which detects an operation amount of the brake pedal 43. The brake pedal operation amount sensor 44 is electrically connected to the ECU 90. The brake pedal operation amount sensor 44 sends information on the detected operation amount to the ECU 90. The ECU 90 acquires the operation amount of the brake pedal 43 as a brake pedal operation amount BP, based on the information sent from the brake pedal operation amount sensor 44.

The ECU 90 calculates and acquires the braking torque to be applied to the own vehicle 100 by the braking apparatus 22 as a driver requested braking torque BTO_D_RQ, based on the brake pedal operation amount BP when the ECU 90 does not execute the moving assist control described later in detail. The ECU 90 controls the operations of the braking apparatus 22 so as to apply the braking torque corresponding to the driver requested braking torque BTO_D_RQ to the own vehicle 100. On the other hand, when the ECU 90 controls the moving assist control, the ECU 90 determines the braking torque necessary to move the own vehicle 100 by the moving assist control as desired as a system requested braking torque BTO_S_RQ. Then, the ECU 90 controls the operations of the braking apparatus 22 so as to apply the braking torque corresponding to the system requested braking torque BTO_S_RQ to the own vehicle 100.

<Steering Angle Sensor>

The steering angle sensor 46 is a sensor which detects a rotation angle of the steering wheel 45 with respect to its neutral position. The steering angle sensor 46 is electrically connected to the ECU 90. The steering angle sensor 46 sends information on the detected rotation angle of the steering wheel 45 to the ECU 90. The ECU 90 acquires the rotation angle of the steering wheel 45 as a steering angle $\theta$, based on the information sent from the steering angle sensor 46.

<Steering Torque Sensor>

The steering torque sensor 47 is a sensor which detects a torque which an own vehicle driver (i.e., a driver of the own vehicle 100) inputs to a steering shaft via the steering wheel 45. The steering torque sensor 47 is electrically connected to the ECU 90. The steering torque sensor 47 sends information on the detected torque to the ECU 90. The ECU 90 acquires the torque which the own vehicle driver inputs to the steering shaft via the steering wheel 45 as a driver input steering torque, based on the information sent from the steering torque sensor 47.

The ECU 90 acquires a requested steering force or a requested steering torque, based on the steering angle $\theta$, the driver input steering torque, and the own vehicle moving speed (i.e., the moving speed of the own vehicle 100). Then, the ECU 90 controls the operations of the steering apparatus 23 so as to output the steering torque corresponding to the requested steering torque.

<Vehicle Moving Speed Detection Device>

The vehicle moving speed detection device 48 is a device which detects the moving speed of the own vehicle 100. The vehicle moving speed detection device 48 may include vehicle wheel rotation speed sensors. The vehicle moving speed detection device 48 is electrically connected to the ECU 90. The vehicle moving speed detection device 48 sends information on the detected moving speed of the own vehicle 100 to the ECU 90. The ECU 90 acquires the moving speed of the own vehicle 100 as the own vehicle moving speed VO, based on the information sent from the vehicle moving speed detection device 48.

<Moving Assist Operation Device>

The moving assist operation device 51 is a device which is operated by the driver of the own vehicle 100. The moving assist operation device 51 may include switches and buttons. The switches and the buttons may be provided on the steering wheel 45 or a lever mounted on a steering column of the own vehicle 100.

In this embodiment, the moving assist operation device 51 includes a moving assist selection switch, a vehicle moving speed setting switch, a vehicle moving speed increase button, a vehicle moving speed decrease button, and an inter-vehicle distance set button. The moving assist operation device 51 is electrically connected to the ECU 90.

When the moving assist control is not executed, and the moving assist selection switch is operated, a signal is sent from the moving assist operation device 51 to the ECU 90. The ECU 90 determines that an execution of the moving assist control is requested in response to receiving the signal in question. On the other hand, when the moving assist control is executed, and the moving assist selection switch is operated by the driver, a signal is sent from the moving assist operation device 51 to the ECU 90. The ECU 90 determines that the execution of the moving assist control is not requested in response to receiving the signal in question. That is, the ECU 90 determines that the execution of the moving assist control is requested to be terminated.

Further, when the moving assist control is executed, and the vehicle moving speed setting switch is operated, a signal is sent from the moving assist operation device 51 to the ECU 90. The ECU 90 sets the current own vehicle moving speed VO as a set vehicle moving speed V_SET for the moving assist control in response to receiving the signal in question.

Further, when the moving assist control is executed, and the vehicle moving speed increase button is operated, a signal is sent from the moving assist operation device 51 to the ECU 90. The ECU 90 increases the set vehicle moving speed V_SET in response to receiving the signal in question. On the other hand, when the moving assist control is executed, and the vehicle moving speed decrease button is operated, a signal is sent from the moving assist operation device 51 to the ECU 90. The ECU 90 decreases the set vehicle moving speed V_SET in response to receiving the signal in question.

Further, when the moving assist control is executed, and the inter-vehicle distance setting button is operated, a signal is sent from the moving assist operation device 51 to the ECU 90. The signal in question is a requested inter-vehicle distance signal which represents a requested forward inter-vehicle distance DF_RQ. The requested forward inter-vehicle distance DF_RQ is a distance which the driver requests by operating the inter-vehicle distance setting button as a forward inter-vehicle distance DF for a following moving control of the moving assist control. The forward inter-vehicle distance DF is a distance between the own vehicle 100 and a preceding vehicle 200F.

Figure 2:
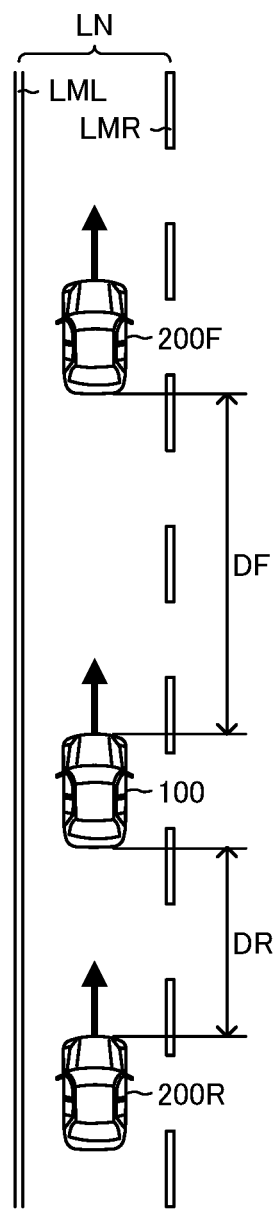
FIG. 2 is a view which shows a forward inter-vehicle distance and a rearward inter-vehicle distance.

As shown in FIG. 2, the forward inter-vehicle distance DF is a distance between the own vehicle 100 and the preceding vehicle 200F and is acquired, based on surrounding detection information IS described later in detail. In this embodiment, the preceding vehicle 200F is a vehicle which moves in front of the own vehicle 100 in an own vehicle moving lane LN (i.e., a traffic lane in which the own vehicle 100 moves) and has the forward inter-vehicle distance DF equal to or smaller than a predetermined distance (i.e., a preceding vehicle determination distance DF_TH). The own vehicle moving lane LN is recognized, based on information on a left lane marking LML at the left side of the own vehicle 100 and a right lane marking LMR at the right side of the own vehicle 100. The lane markings LML and LMR are acquired, based on the surrounding detection information IS. Further, in this embodiment, the requested forward inter-vehicle distance DF_RQ which the driver can select by operating the inter-vehicle distance setting button, is one of three different distances, i.e., a long distance, a middle distance, and a short distance.

In this embodiment, when the ECU 90 receives the requested inter-vehicle distance signal, the ECU 90 sets a set forward inter-vehicle distance DF_SET, based on the current own vehicle moving speed VO and the requested forward inter-vehicle distance DF_RQ. In this regard, the ECU 90 may set the requested forward inter-vehicle distance DF_RQ as the set forward inter-vehicle distance DF_SET, independently of the current own vehicle moving speed VO.

In particular, the ECU 90 sets the set forward inter-vehicle distance DF_SET to the forward inter-vehicle distance DF which leads to a predicted reaching time TTC equal to a predetermined time (i.e., a predetermined predicted reaching time TTC_REF). The predicted reaching time TTC is acquired by dividing the forward inter-vehicle distance DF by the current own vehicle moving speed VO. That is, the ECU 90 sets the set forward inter-vehicle distance DF_SET to the forward inter-vehicle distance DF which satisfies a relationship between the current own vehicle moving speed VO, the predetermined predicted reaching time TTC_REF, and the forward inter-vehicle distance DF represented by a formula (1) below.

$$TTC\_REF = DF/VO \quad (1)$$

The predetermined predicted reaching time TTC_REF is a long time TTC_L when the requested forward inter-vehicle distance DF_RQ is the long distance. The predetermined predicted reaching time TTC_REF is a middle time TTC_L when the requested forward inter-vehicle distance DF_RQ is the middle distance. The predetermined predicted reaching time TTC_REF is a short time TTC_L when the requested forward inter-vehicle distance DF_RQ is the short distance. It should be noted that the preceding vehicle determination distance DF_TH is set to be greater than the set forward inter-vehicle distance DF_SET.

<Economy Moving Operation Device>

The economy moving operation device 52 is a device which is operated by the driver of the own vehicle 100. The economy moving operation device 52 may be a switch or a button. The switch or the button may be provided on the steering wheel 45 of the own vehicle 100. Alternatively, the switch or the button may be provided on the lever mounted on the steering column of the own vehicle 100.

The economy moving operation device 52 is turned into an ON state when the economy moving operation device 52 is operated while the economy moving operation device 52 is in an OFF state. When the economy moving operation device 52 is turned into the ON state, the economy moving operation device 52 sends a signal to the ECU 90. When the ECU 90 receives the signal in question, the ECU 90 determines that an execution of an enlarged moving assist control or an economy moving assist control is requested. When the ECU 90 determines that the execution of the enlarged moving assist control is requested, the ECU 90 determines that an economy moving execution condition becomes satisfied.

On the other hand, the economy moving operation device 52 is turned into the OFF state when the economy moving operation device 52 is operated while the economy moving operation device 52 is in the ON state. When the economy moving operation device 52 is turned into the OFF state, the economy moving operation device 52 sends a signal to the ECU 90. When the ECU 90 receives the signal in question, the ECU 90 determines that the execution of the enlarged moving assist control is not requested. When the ECU 90 determines that the execution of the enlarged moving assist control is not requested, the ECU 90 determines that the economy moving execution condition becomes unsatisfied.

<Surrounding Information Detection Apparatus>

The surrounding information detection apparatus 60 is an apparatus which detects information on a situation around the own vehicle 100. In this embodiment, the surrounding information detection apparatus 60 includes radio wave sensors 61 and image sensors 62.

<Radio Wave Sensors>

Each radio wave sensor 61 is a sensor which detects information on objects around the own vehicle 100 by using radio waves. The radio wave sensor 61 may be a radar sensor such as a millimeter wave sensor, or a sonic wave such as an ultrasonic wave sensor such as a clearance sonar, or a laser radar such as a LiDAR. The radio wave sensors 61 are electrically connected to the ECU 90. The radio wave sensor 61 transmits radio waves and receives reflected waves (i.e., the radio waves reflected by the objects). The radio wave sensor 61 sends information on the transmitted radio waves and the received waves (i.e., the received reflected waves) to the ECU 90. In other words, the radio wave sensor 61 detects the objects around the own vehicle 100 and sends information on the detected objects to the ECU 90. The ECU 90 can acquire surrounding detection information IS (i.e., information on the objects around the own vehicle 100), based on the information including radio wave information or radio wave data sent from the radio wave sensors 61. The objects detected by the radio wave sensors 61 may be vehicles, walls, bicycles, and persons.

<Image Sensors>

Each image sensor 62 is a sensor which takes images of a view around the own vehicle 100. The image sensor 62 may be a camera. The image sensors 62 are electrically connected to the ECU 90. The image sensor 62 takes the images of the view around the own vehicle 100 and sends information on the taken images to the ECU 90. The ECU 90 can acquire the surrounding detection information IS (i.e., the information on the situation around the own vehicle 100), based on the information including image information or image data sent from the image sensors 62.

The ECU 90 acquires a forward inter-vehicle distance DF and a preceding vehicle moving speed VF, based on the surrounding detection information IS. The forward inter-vehicle distance DF is a distance between the preceding vehicle 200F and the own vehicle 100. The preceding vehicle moving speed VF is the moving speed of the preceding vehicle 200F. Further, the ECU 90 acquires a rearward inter-vehicle distance DR and a following vehicle moving speed VR, based on the surrounding detection information IS. The rearward inter-vehicle distance DR is a distance between a following vehicle 200R and the own vehicle 100. The following vehicle moving speed VR is the moving speed of the following vehicle 200R.

As shown in FIG. 2, the rearward inter-vehicle distance DR is a distance between the own vehicle 100 and the following vehicle 200R. In this embodiment, the following vehicle 200R is a vehicle which moves behind the own vehicle 100 in the own vehicle moving lane LN and has the rearward inter-vehicle distance DR equal to or smaller than a following vehicle determination distance DR_TH.

<Summary of Operations of Vehicle Driving Assist Apparatus>

Next, a summary of operations of the vehicle driving assist apparatus 10 will be described. The vehicle driving assist apparatus 10 is configured to execute the moving assist control. The moving assist control is a control which causes the own vehicle 100 to move by autonomously accelerating and decelerating the own vehicle 100 even when the driver does not operate the accelerator pedal 41 and the brake pedal 43.

Figure 3:
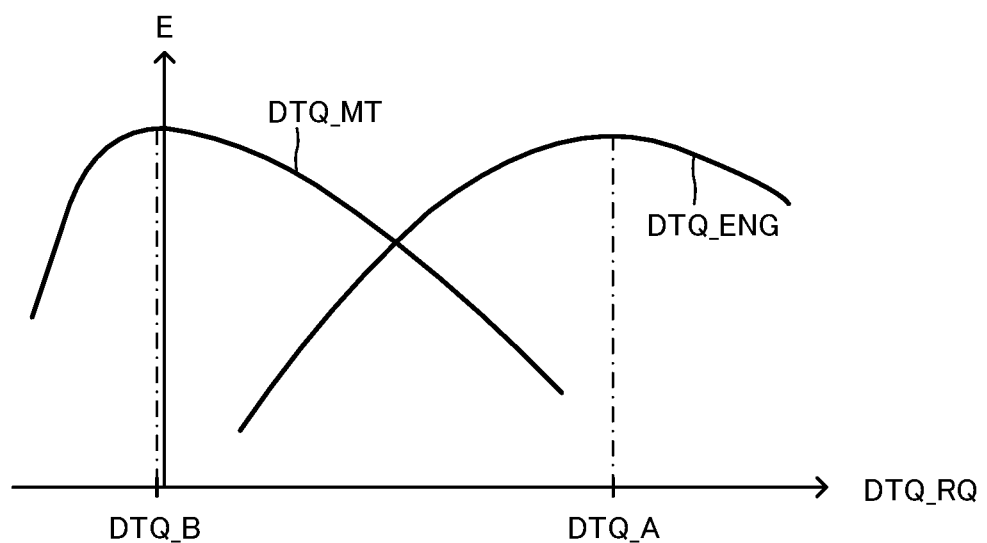
FIG. 3 is a view which shows a power output efficiency of an internal combustion engine, a power output efficiency of an electric motor, and a requested driving torque.

As described above, in this embodiment, the driving apparatus 21 includes the first power source 211 and the second power source 212. The first power source 211 and the second power source 212 have the different power output properties. The power output property corresponds to an energy efficiency of outputting power. In this embodiment, the first power source 211 and the second power source 212 have the power output properties shown in FIG. 3. In particular, as shown by a line DTQ_ENG, a power output efficiency E1 of the first power source 211 takes the greatest value when the driving torque which the first power source 211 outputs, is a value DTQ_A. Further, as shown by a line DTQ_MT, a power output efficiency E2 of the second power source 212 takes the greatest value when the driving torque which the second power source 212 outputs, is a value DTQ_B smaller than the value DTQ_A.

It should be noted that when the first power source 211 and the second power source 212 are the internal combustion engine and the electric motor, respectively, the power output efficiency E1 of the first power source 211 relates to a so-called fuel consumption, and the power output efficiency E2 of the second power source 212 relates to a so-called electric power consumption.

As described above, a power output efficiency E of the driving apparatus 21 has a property that the power output efficiency E takes peak values when the driving torque which the driving apparatus 21 outputs, is particular values (i.e., optimum driving torques DTQ_OPT). In this embodiment, the power output efficiency E has two peak values. Thus, if the own vehicle 100 is accelerated by controlling the operations of the driving apparatus 21 to output the driving torque corresponding to the optimum driving torque DTQ_OPT, the power output efficiency E of the driving apparatus 21 is increased.

Accordingly, as far as an economy moving forbiddance condition does not become satisfied, the vehicle driving assist apparatus 10 executes the economy moving assist control when (i) the moving assist execution condition is satisfied, and (ii) the economy moving execution condition is satisfied. The economy moving forbiddance condition is a condition that an acceleration and a deceleration of the own vehicle 100 to keep the power output efficiency E of the driving apparatus 21 great, are not permitted. As described later in detail, in general, the economy moving assist control is an optimum acceleration control to autonomously accelerate and decelerate the own vehicle 100 so as to (i) maintain the own vehicle moving speed VO within a predetermined speed range (i.e., a predetermined vehicle moving speed range RNG_E), or (ii) maintain the forward inter-vehicle distance DF within a predetermined forward distance range, or (iii) the rearward inter-vehicle distance DR within a predetermined rearward distance range. The economy moving assist control includes a coasting control to decelerate the own vehicle 100 and an optimum acceleration control to accelerate the own vehicle 100.

The coasting control is a control to cause the own vehicle 100 to coast by causing the driving apparatus 21 to output the driving force not to accelerate nor decelerate the own vehicle 100. In this embodiment, the coasting control is a control to cause the own vehicle 100 to coast by (i) stopping the operations of the first power source 211 such as the internal combustion engine and (ii) causing the second power source 212 to output the driving torque so as to keep the power output efficiency E2 of the second power source 212 such as the electric motor at the greatest efficiency. Thereby, the own vehicle 100 is decelerated mainly by a moving resistance of the own vehicle 100.

On the other hand, the optimum acceleration control is a control to (i) calculate an optimum acceleration G_OPT as a system requested acceleration G_S_RQ, (ii) calculate the driving torque realizing the system requested acceleration G_S_RQ as the system requested driving torque DTQ_S_RQ, and (iii) control the operations of the driving apparatus 21 to output the driving torque corresponding to the system requested driving torque DTQ_S_RQ to accelerate the own vehicle 100. The optimum acceleration G_OPT is an acceleration of the own vehicle 100 which maintains the power output efficiency E of the driving apparatus 21 at the maximum efficiency at the current own vehicle moving speed VO.

It should be noted that the optimum acceleration control may be a control to (i) calculate as the system requested acceleration G_S_RQ, the acceleration of the own vehicle 100 which maintains the power output efficiency E of the driving apparatus 21 at a value slightly greater or smaller than the maximum efficiency at the current own vehicle moving speed VO, (ii) calculate the driving torque realizing the system requested acceleration G_S_RQ as the system requested driving torque DTQ_S_RQ, and (iii) control the operations of the driving apparatus 21 to output the driving torque corresponding to the system requested driving torque DTQ_S_RQ to accelerate the own vehicle 100. That is, the optimum acceleration control may be a control to control the operations of the driving apparatus 21 at the optimum power output efficiency including the maximum power output efficiency and the power output efficiency slightly smaller than the maximum power output efficiency. That is, the optimum acceleration control is a control to control the operations of the driving apparatus 21 to accelerate the own vehicle 100 so as to maintain the power output efficiency of the driving apparatus 21 at an efficiency equal to or greater than a predetermined efficiency.

Below, the controls executed by the vehicle driving assist apparatus 10 will be described in detail.

<Ordinary Moving Control>

When the moving assist execution condition is not satisfied, the vehicle driving assist apparatus 10 executes an ordinary moving control. The ordinary moving control is a control to (i) calculate the driver requested driving torque DTQ_D_RQ to be output from the driving apparatus 21, based on the accelerator pedal operation amount AP and the own vehicle moving speed VO and (ii) control the operations of the driving apparatus 21 to output the driving torque corresponding to the driver requested driving torque DTQ_D_RQ, and (i) calculate the driver requested braking torque BTQ_D_RQ to be applied to the own vehicle 100 by the braking apparatus 22, based on the brake pedal operation amount BP and (ii) control the operations of the braking apparatus 22 to output the braking torque corresponding to the driver requested braking torque BTQ_D_RQ.

It should be noted that when the vehicle driving assist apparatus 10 executes the ordinary moving control, and the driver requested driving torque DTQ_D_RQ is greater than an operation switching threshold DTQ_SW greater than zero, the vehicle driving assist apparatus 10 causes the driving apparatus 21 to output the driving torque corresponding to the driver requested driving torque DTQ_D_RQ by causing the first power source 211 and the second power source 212 to output the driving torque. On the other hand, when the vehicle driving assist apparatus 10 executes the ordinary moving control, and the driver requested driving torque DTQ_D_RQ is equal to or smaller than the operation switching threshold DTQ_SW, the vehicle driving assist apparatus 10 causes the driving apparatus 21 to output the driving torque corresponding to the driver requested driving torque DTQ_D_RQ by stopping the operations of the first power source 211 and causing the second power source 212 to output the driving torque.

<Ordinary Moving Assist Control>

On the other hand, when the moving assist execution condition is satisfied, the vehicle driving assist apparatus 10 determines whether the economy moving execution condition is satisfied. When the economy moving execution condition is not satisfied, the vehicle driving assist apparatus 10 execute an ordinary moving assist control as the moving assist control.

In this embodiment, the vehicle driving assist apparatus 10 determines that the moving assist execution condition is satisfied when the vehicle driving assist apparatus 10 determines that the execution of the moving assist control is requested, and the accelerator pedal 41 and the brake pedal 43 are not operated. In this regard, the vehicle driving assist apparatus 10 may be configured to determine that the moving assist execution condition is satisfied, independently of whether the accelerator pedal 41 or the brake pedal 43 is operated when the moving assist operation device 51 is operated, and the execution of the moving assist control is requested.

Further, the vehicle driving assist apparatus 10 determines that the moving assist execution condition becomes unsatisfied, that is, a moving assist control termination condition for terminating the moving assist control becomes satisfied when the moving assist operation device 51 is operated while the moving assist control is executed, and a termination of the moving assist control is requested. Further, the vehicle driving assist apparatus 10 determines that the moving assist control termination condition becomes satisfied when the brake pedal 43 is operated while the moving assist control is executed, that is, the brake pedal operation amount BP becomes greater than zero. When the moving assist control termination condition becomes satisfied, the vehicle driving assist apparatus 10 terminates the moving assist control and starts the ordinary moving control.

When there is the preceding vehicle 200F, the vehicle driving assist apparatus 10 executes an ordinary following moving control as the ordinary moving assist control. As described above, the vehicle driving assist apparatus 10 determines that there is the preceding vehicle 200F when there is a vehicle moving ahead of the own vehicle 100 in the own vehicle moving lane LN and having the forward inter-vehicle distance DF equal to or smaller the preceding vehicle determination distance DF_TH. On the other hand, when there is not the preceding vehicle 200F, the vehicle driving assist apparatus 10 executes an ordinary constant speed moving control as the ordinary moving assist control.

<Ordinary Following Moving Control>

The ordinary following moving control is a control to autonomously accelerate and decelerate the own vehicle 100 so as to maintain the forward inter-vehicle distance DF (i.e., the distance between the own vehicle 100 and the preceding vehicle 200F) at the set forward inter-vehicle distance DF_SET.

Thus, while the vehicle driving assist apparatus 10 executes the ordinary following moving control, the vehicle driving assist apparatus 10 accelerates and decelerates the own vehicle 100 so as to maintain the forward inter-vehicle distance DF at the set forward inter-vehicle distance DF_SET. In this embodiment, while the vehicle driving assist apparatus 10 executes the ordinary following moving control, the vehicle driving assist apparatus 10 accelerates and decelerates the own vehicle 100 so as to maintain the predicted reaching time TTC at the predetermined predicted reaching time TTC_REF.

In particular, while the vehicle driving assist apparatus 10 executes the ordinary following moving control, the vehicle driving assist apparatus 10 calculates the system requested acceleration G_S_RQ necessary to maintain the predicted reaching time TTC at the predetermined predicted reaching time TTC_REF.

When the vehicle driving assist apparatus 10 calculates the system requested acceleration G_S_RQ, the vehicle driving assist apparatus 10 calculates the driving torque to be output from the driving apparatus 21 as the system requested driving torque DTQ_S_RQ and the braking torque to be applied to the own vehicle 100 by the braking apparatus 22 as the system requested braking torque BTQ_S_RQ to realize the system requested acceleration G_S_RQ. Then, the vehicle driving assist apparatus 10 controls the operations of the driving apparatus 21 to output the driving torque corresponding to the system requested driving torque DTQ_S_RQ and the operations of the braking apparatus 22 to apply the braking torque corresponding to the system requested braking torque BTQ_S_RQ to the own vehicle 100.

Thereby, when the predicted reaching time TTC becomes greater than the predetermined predicted reaching time TTC_REF, the own vehicle 100 is accelerated. On the other hand, when the predicted reaching time TTC becomes smaller than the predetermined predicted reaching time TTC_REF, the own vehicle 100 is decelerated. Thereby, the predicted reaching time TTC is maintained at the predetermined predicted reaching time TTC_REF.

It should be noted that when the accelerator pedal 41 is operated, and the driver requested driving torque DTQ_D_RQ becomes greater than the system requested driving torque DTQ_S_RQ while the ordinary following moving control is executed, the vehicle driving assist apparatus 10 determines that an accelerator override state or a driver override state is produced and temporarily stops the ordinary following moving control. Then, the vehicle driving assist apparatus 10 controls the operations of the driving apparatus 21 to output the driving torque corresponding to the driver requested driving torque DTQ_D_RQ. That is, the vehicle driving assist apparatus 10 temporarily stops the ordinary following moving control and executes the ordinary moving control. Thereafter, when the accelerator pedal 41 becomes unoperated, and the driver requested driving torque DTQ_D_RQ becomes equal to or smaller than the system requested driving torque DTQ_S_RQ, the vehicle driving assist apparatus 10 restarts the ordinary following moving control.

<Ordinary Constant Speed Moving Control>

The ordinary constant speed moving control is a control to autonomously accelerate and decelerate the own vehicle 100 so as to maintain the own vehicle moving speed VO at the set vehicle moving speed V_SET.

Thus, while the vehicle driving assist apparatus 10 executes the ordinary constant speed moving control, the vehicle driving assist apparatus 10 accelerates and decelerates the own vehicle 100 so as to maintain the own vehicle moving speed VO at the set vehicle moving speed V_SET.

In particular, while the vehicle driving assist apparatus 10 executes the ordinary constant speed moving control, the vehicle driving assist apparatus 10 calculates the system requested acceleration G_S_RQ necessary to maintain the own vehicle moving speed VO at the set vehicle moving speed V_SET.

When the vehicle driving assist apparatus 10 calculates the system requested acceleration G_S_RQ, the vehicle driving assist apparatus 10 calculates the driving torque to be output from the driving apparatus 21 as the system requested driving torque DTQ_S_RQ and the braking torque to be applied to the own vehicle 100 by the braking apparatus 22 as the system requested braking torque BTQ_S_RQ to realize the system requested acceleration G_S_RQ. Then, the vehicle driving assist apparatus 10 controls the operations of the driving apparatus 21 to output the driving torque corresponding to the system requested driving torque DTQ_S_RQ and the operations of the braking apparatus 22 to apply the braking torque corresponding to the system requested braking torque BTQ_S_RQ to the own vehicle 100.

Thereby, when the own vehicle moving speed VO becomes smaller than the set vehicle moving speed V_SET, the own vehicle 100 is accelerated. On the other hand, when the own vehicle moving speed VO becomes greater than the set vehicle moving speed V_SET, the own vehicle 100 is decelerated. Thereby, the own vehicle moving speed VO is maintained at the set vehicle moving speed V_SET.

As described above, in this embodiment, the vehicle driving assist apparatus 10 accelerates and decelerates the own vehicle 100, based on the set vehicle moving speed V_SET while the vehicle driving assist apparatus 10 executes the ordinary constant speed moving control. In this regard, the vehicle driving assist apparatus 10 may be configured to set an ordinary vehicle moving speed control range RNG_N used for determining whether to accelerate or decelerate the own vehicle 100. The ordinary vehicle moving speed control range RNG_N is a range of the vehicle moving speed which includes and depends on the set vehicle moving speed V_SET. In this case, the vehicle driving assist apparatus 10 accelerates the own vehicle 100 to increase the own vehicle moving speed VO when the own vehicle moving speed VO decreases and becomes smaller than an ordinary vehicle moving speed lower limit VL_N (i.e., a lower limit of the ordinary vehicle moving speed control range RNG_N). On the other hand, the vehicle driving assist apparatus 10 decelerates the own vehicle 100 to decrease the own vehicle moving speed VO when the own vehicle moving speed VO increases and becomes greater than an ordinary vehicle moving speed upper limit VU_N (i.e., an upper limit of the ordinary vehicle moving speed control range RNG_N). Thereby, an average VO_AVE of the own vehicle moving speed VO is maintained at around the set vehicle moving speed V_SET.

Further, when the accelerator pedal 41 is operated, and the driver requested driving torque DTQ_D_RQ becomes greater than the system requested driving torque DTQ_S_RQ while the ordinary constant speed moving control is executed, the vehicle driving assist apparatus 10 determines that the accelerator override state is produced and temporarily stops the ordinary constant speed moving control. Then, the vehicle driving assist apparatus 10 controls the operations of the driving apparatus 21 to output the driving torque corresponding to the driver requested driving torque DTQ_D_RQ. That is, the vehicle driving assist apparatus 10 temporarily stops the ordinary constant speed moving control and executes the ordinary moving control. Thereafter, when the accelerator pedal 41 becomes unoperated, and the driver requested driving torque DTQ_D_RQ becomes equal to or smaller than the system requested driving torque DTQ_S_RQ, the vehicle driving assist apparatus 10 restarts the ordinary constant speed moving control.

<Economy Moving Assist Control (Enlarged Moving Assist Control)>

As described above, when the moving assist execution condition and the economy moving execution condition are both satisfied, the vehicle driving assist apparatus 10 executes the economy moving assist control. The economy moving assist control will be described with referent to flowcharts shown in FIG. 4 to FIG. 8. The vehicle driving assist apparatus 10 is configured to execute a routine shown in FIG. 4 with a predetermined calculation cycle.

Figure 4:
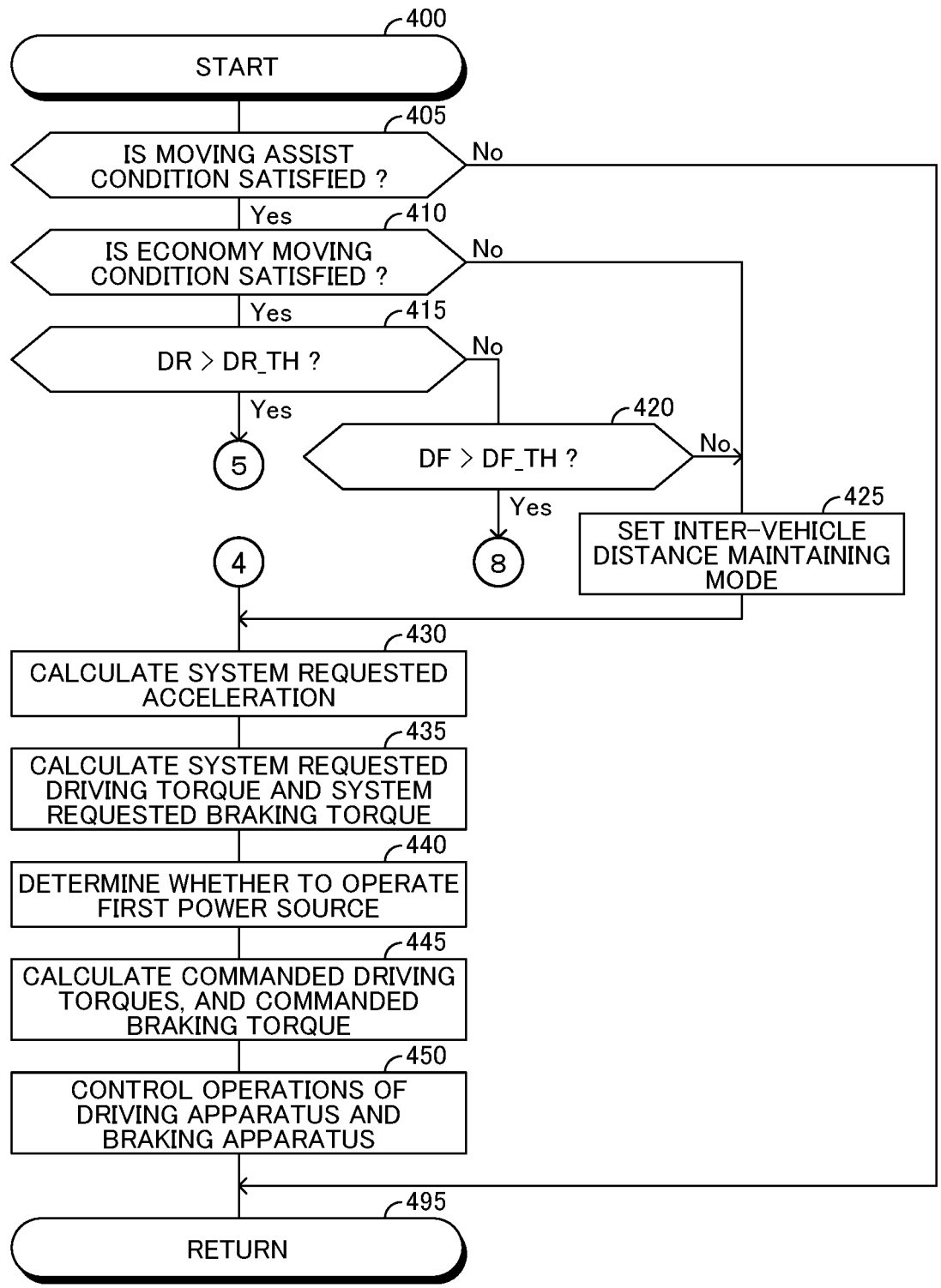
FIG. 4 is a view which shows a flowchart of a routine executed by the vehicle driving assist apparatus according to the embodiment of the invention.

At a predetermined timing, the vehicle driving assist apparatus 10 starts a process from a step 400 of the routine shown in FIG. 4 and proceeds with the process to a step 405 to determine whether the moving assist execution condition is satisfied. When the moving assist execution condition is not satisfied, the vehicle driving assist apparatus 10 does not execute the moving assist control. Thus, when the vehicle driving assist apparatus 10 determines "No" at the step 405, the vehicle driving assist apparatus 10 proceeds with the process directly to a step 495 to terminate this routine once. In this case, the vehicle driving assist apparatus 10 executes the ordinary moving control.

On the other hand, when the vehicle driving assist apparatus 10 determines "Yes" at the step 405, the vehicle driving assist apparatus 10 proceeds with the process to a step 410 to determine whether the economy moving execution condition is satisfied. When the vehicle driving assist apparatus 10 determines "No" at the step 410, the vehicle driving assist apparatus 10 proceeds with the process to a step 425 to set a control mode to an inter-vehicle distance maintaining mode. That is, when the moving assist execution condition is satisfied, but the economy moving execution condition is not satisfied, the vehicle driving assist apparatus 10 sets the control mode to the inter-vehicle distance maintaining mode.

When the vehicle driving assist apparatus 10 sets the control mode to the inter-vehicle distance maintaining mode, the vehicle driving assist apparatus 10 executes the ordinary following moving control or the ordinary constant speed moving control, depending on whether there is the preceding vehicle 200F.

Thus, after the vehicle driving assist apparatus 10 sets the control mode to the inter-vehicle distance maintaining mode at the step 425, the vehicle driving assist apparatus 10 proceeds with the process to a step 430 to calculate the acceleration of the own vehicle 100 necessary to maintain the predicted reaching time TTC at the predetermined predicted reaching time TTC_REF as the system requested acceleration G_S_RQ when there is the preceding vehicle 200F. On the other hand, when there is not the preceding vehicle 200F, the vehicle driving assist apparatus 10 calculates the acceleration of the own vehicle 100 necessary to maintain the own vehicle moving speed VO at the set vehicle moving speed V_SET as the system requested acceleration G_S_RQ.

Next, the vehicle driving assist apparatus 10 proceeds with the process to a step 435 to calculate the driving torque to be output from the driving apparatus 21 as the system requested driving torque DTQ_S_RQ and the braking torque to be applied to the own vehicle 100 by the braking apparatus 22 as BTQ_S_RQ so as to realize the system requested acceleration G_S_RQ calculated at the step 430. It should be noted that when the system requested driving torque DTQ_S_RQ calculated is greater than zero, the system requested braking torque BTQ_S_RQ calculated is zero. Similarly, when the system requested braking torque BTQ_S_RQ calculated is greater than zero, the system requested driving torque DTQ_S_RQ calculated is zero.

Next, the vehicle driving assist apparatus 10 proceeds with the process to a step 440 to determine whether to operate the first power source 211 in order to output the driving torque corresponding to the system requested driving torque DTQ_S_RQ calculated at the step 435 from the driving apparatus 21. When the system requested driving torque DTQ_S_RQ is greater than the operation switching threshold DTQ_SW, the vehicle driving assist apparatus 10 determines to operate the first power source 211. On the other hand, when the system requested driving torque DTQ_S_RQ is equal to or smaller than the operation switching threshold DTQ_SW, the vehicle driving assist apparatus 10 determines not to operate the first power source 211.

Next, the vehicle driving assist apparatus 10 proceeds with the process to a step 445 to calculate commanded driving torques DTQ_COM for the first power source 211 and the second power source 212. When the vehicle driving assist apparatus 10 determines to operate the first power source 211 at the step 440, and the vehicle driving assist apparatus 10 proceeds with the process to the step 445, the commanded driving torques DTQ_COM calculated are the driving torques to be output from the first power source 211 and the second power source 212, respectively so as to output the driving torque corresponding to the system requested driving torque DTQ_S_RQ calculated at the step 435 from the driving apparatus 21. It should be noted that in this embodiment, the commanded driving torque DTQ_COM calculated at this step for the second power source 212 is zero.

On the other hand, when (i) the system requested driving torque DTQ_S_RQ calculated at the step 435 is greater than zero, (ii) the vehicle driving assist apparatus 10 determines not to operate the first power source 211 at the step 440, and (iii) the vehicle driving assist apparatus 10 proceeds with the process to the step 445, the commanded driving torque DTQ_COM calculated for the second power source 212 corresponds to the system requested driving torque DTQ_S_RQ calculated at the step 435.

Further, when the system requested braking torque BTQ_S_RQ calculated at the step 435 is greater than zero, and the vehicle driving assist apparatus 10 proceeds with the process to the step 445, the vehicle driving assist apparatus 10 calculates a commanded braking torque BTQ_COM. The commanded braking torque BTQ_COM calculated corresponds to the system requested braking torque BTQ_S_RQ calculated at the step 435. It should be noted that in this embodiment, the commanded driving torques DTQ_COM calculated at the step 445 for the first power source 211 and the second power source 212 are zero.

Next, the vehicle driving assist apparatus 10 proceeds with the process to a step 450 to control the operations of the first power source 211 and the first power source 211 so as to output the driving torques corresponding to the commanded driving torques DTQ_COM calculated at the step 445 and the operations of the braking apparatus 22 so as to apply the braking torque corresponding to the commanded braking torque BTQ_COM calculated at the step 445 to the own vehicle 100. Thereby, the ordinary following moving control or the ordinary constant speed moving control is executed.

After the vehicle driving assist apparatus 10 executes a process of the step 450, the vehicle driving assist apparatus 10 proceeds with the process to the step 495 to terminate this routine once.

On the other hand, when the vehicle driving assist apparatus 10 determines "Yes" at the step 410, the vehicle driving assist apparatus 10 proceeds with the process to a step 415 to determine whether the rearward inter-vehicle distance DR is greater than the following vehicle determination value DR_TH. That is, when the moving assist execution condition and the economy moving execution condition are both satisfied, the vehicle driving assist apparatus 10 determines whether there is not the following vehicle 200R.

Figure 5:
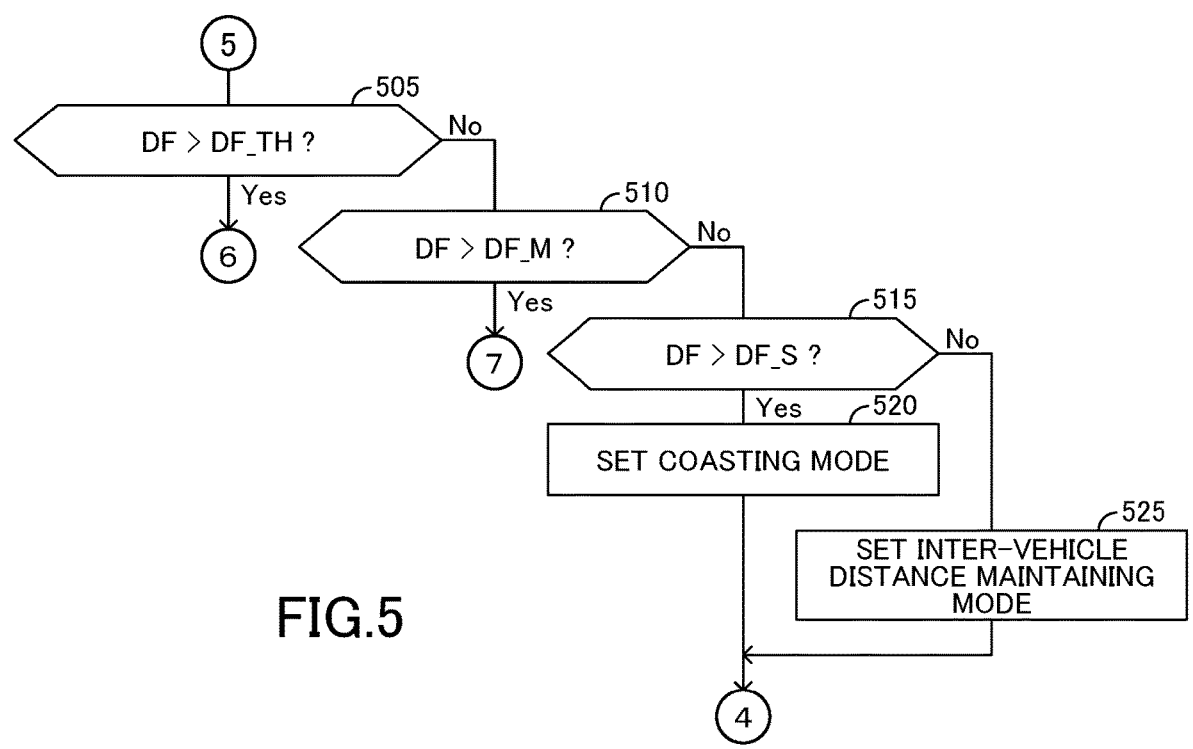
FIG. 5 is a view which shows a flowchart of a routine executed by the vehicle driving assist apparatus according to the embodiment of the invention.

When the vehicle driving assist apparatus 10 determines "Yes" at the step 415, that is, the vehicle driving assist apparatus 10 determines that there is not the following vehicle 200R, the vehicle driving assist apparatus 10 proceeds with the process to a step 505 of a routine shown in FIG. 5 to determine whether the forward inter-vehicle distance DF is greater than the following vehicle determination value DR_TH. That is, the vehicle driving assist apparatus 10 determines whether there is not the preceding vehicle 200F.

Figure 6:
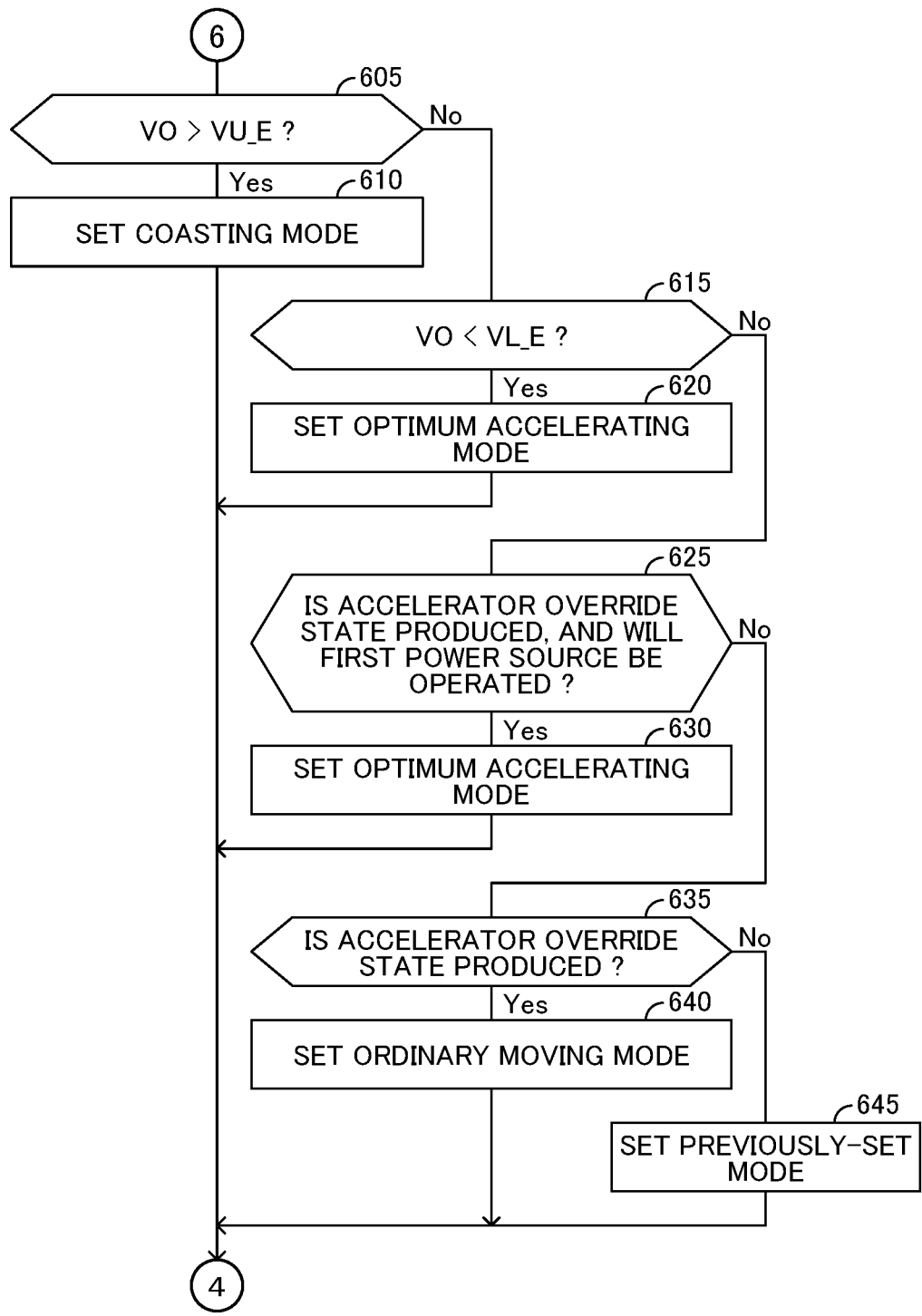
FIG. 6 is a view which shows a flowchart of a routine executed by the vehicle driving assist apparatus according to the embodiment of the invention.

When the vehicle driving assist apparatus 10 determines "Yes" at the step 505, the vehicle driving assist apparatus 10 proceeds with the process to a step 605 of a routine shown in FIG. 6 to determine whether the own vehicle moving speed VO is greater than the economy vehicle moving speed upper limit VU_E. That is, when there are not the following vehicle 200R and the preceding vehicle 200F, the vehicle driving assist apparatus 10 determines whether the own vehicle moving speed VO is greater than the economy vehicle moving speed upper limit VU_E.

When the vehicle driving assist apparatus 10 determines "Yes" at the step 605, the vehicle driving assist apparatus 10 proceeds with the process to a step 610 to set the control mode to a coasting mode. That is, when there are not the following vehicle 200R and the preceding vehicle 200F, and the own vehicle moving speed VO is greater than the economy vehicle moving speed upper limit VU_E, the vehicle driving assist apparatus 10 sets the control mode to the coasting mode. Next, the vehicle driving assist apparatus 10 proceeds with the process to the step 430 of the routine shown in FIG. 4.

At the step 430, the vehicle driving assist apparatus 10 calculates the system requested acceleration G_S_RQ. At this time, the control mode is set to the coasting mode. Thus, the system requested acceleration G_S_RQ calculated at this time is the acceleration which makes the system requested driving torque DTQ_S_RQ calculated at the next step 435 zero.

Next, the vehicle driving assist apparatus 10 proceeds with the process to the step 435 to calculate the system requested driving torque DTQ_S_RQ realizing the system requested acceleration G_S_RQ calculated at the step 430. As described above, when the control mode is set to the coasting mode, the system requested acceleration G_S_RQ calculated at the step 430 is the acceleration which makes the system requested driving torque DTQ_S_RQ zero. Thus, the system requested driving torque DTQ_S_RQ calculated at the step 435 is zero. It should be noted that the system requested braking torque BTQ_S_RQ calculated at this time is also zero.

Next, the vehicle driving assist apparatus 10 proceeds with the process to the step 440 to determine whether to operate the first power source 211 in order to output the driving torque corresponding to the system requested driving torque DTQ_S_RQ calculated at the step 435 from the driving apparatus 21. At this time, the system requested driving torque DTQ_S_RQ is zero. Thus, the vehicle driving assist apparatus 10 determines not to operate the first power source 211.

Next, the vehicle driving assist apparatus 10 proceeds with the process to the step 445 to calculate the commanded driving torques DTQ_COM, based on the system requested driving torque DTQ_S_RQ. At this time, the system requested driving torque DTQ_S_RQ is zero. Thus, the commanded driving torques DTQ_COM calculated at the step 445 for the first power source 211 and the second power source 212 are zero. It should be noted that the commanded braking torque BTQ_COM calculated at the step 445 is also zero.

Next, the vehicle driving assist apparatus 10 proceeds with the process to the step 450 to control the operations of the first power source 211 and the first power source 211 so as to output the driving torques corresponding to the commanded driving torques DTQ_COM calculated at the step 445 and the operations of the braking apparatus 22 so as to apply the braking torque corresponding to the commanded braking torque BTQ_COM calculated at the step 445 to the own vehicle 100. That is, at this time, the commanded driving torques DTQ_COM and the commanded braking torque BTQ_COM are all zero. Thus, the vehicle driving assist apparatus 10 does not operate the first power source 211 and controls the operations of the second power source 212 at the optimum power output efficiency. Thereby, the coasting control is executed.

After the vehicle driving assist apparatus 10 executes the process of the step 450, the vehicle driving assist apparatus 10 proceeds with the process to the step 495 to terminate this routine once.

On the other hand, when the vehicle driving assist apparatus 10 determines "No" at the step 605 of the routine shown in FIG. 6, the vehicle driving assist apparatus 10 proceeds with the process to a step 615 to determine whether the own vehicle moving speed VO is smaller than the economy vehicle moving speed lower limit VL_E. That is, when there are not the following vehicle 200R and the preceding vehicle 200F, and the own vehicle moving speed VO is equal to or smaller than the economy vehicle moving speed upper limit VU_E, the vehicle driving assist apparatus 10 determines whether the own vehicle moving speed VO is smaller than the economy vehicle moving speed lower limit VL_E.

When the vehicle driving assist apparatus 10 determines "Yes" at the step 615, the vehicle driving assist apparatus 10 proceeds with the process to a step 620 to set the control mode to an optimum accelerating mode. That is, when there are not the following vehicle 200R and the preceding vehicle 200F, and the own vehicle moving speed VO is smaller than the economy vehicle moving speed lower limit VL_E, the vehicle driving assist apparatus 10 sets the control mode to the optimum accelerating mode. Next, the vehicle driving assist apparatus 10 proceeds with the process to the step 430 of the routine shown in FIG. 4.

At the step 430, the vehicle driving assist apparatus 10 calculates the system requested acceleration G_S_RQ. At this time, the control mode is set to the optimum accelerating mode. Thus, the system requested acceleration G_S_RQ calculated at this time is the acceleration which leads to the system requested driving torque DTQ_S_RQ calculated at the next step 435 which leads to the optimum power output efficiency of the driving apparatus 21.

Next, the vehicle driving assist apparatus 10 proceeds with the process to the step 435 to calculate the system requested driving torque DTQ_S_RQ realizing the system requested acceleration G_S_RQ calculated at the step 430. As described above, when the control mode is set to the optimum accelerating mode, the system requested acceleration G_S_RQ calculated at the step 430 leads to the system requested driving torque DTQ_S_RQ which leads to the optimum power output efficiency of the driving apparatus 21. Thus, the system requested driving torque DTQ_S_RQ calculated at the step 435 is the driving torque which leads to the optimum power output efficiency of the driving apparatus 21. It should be noted that the system requested braking torque BTQ_S_RQ calculated at this time is zero.

Next, the vehicle driving assist apparatus 10 proceeds with the process to the step 440 to determine whether to operate the first power source 211 in order to output the driving torque corresponding to the system requested driving torque DTQ_S_RQ calculated at the step 435 from the driving apparatus 21.

Next, the vehicle driving assist apparatus 10 proceeds with the process to the step 445 to calculate the commanded driving torques DTQ_COM, based on the system requested driving torque DTQ_S_RQ. It should be noted that when the control mode is set to the optimum accelerating mode, the commanded braking torque BTQ_COM calculated at the step 445 is zero.

Next, the vehicle driving assist apparatus 10 proceeds with the process to the step 450 to control the operations of the first power source 211 and the first power source 211 so as to output the driving torques corresponding to the commanded driving torques DTQ_COM calculated at the step 445. It should be noted that the commanded braking torque BTQ_COM calculated at the step 445 is zero and thus, the braking apparatus 22 is not operated. Thereby, the optimum acceleration control is executed.

After the vehicle driving assist apparatus 10 executes the process of the step 450, the vehicle driving assist apparatus 10 proceeds with the process to the step 495 to terminate this routine once.

On the other hand, when the vehicle driving assist apparatus 10 determines "No" at the step 615 of the routine shown in FIG. 6, the vehicle driving assist apparatus 10 proceeds with the process to a step 625. That is, when there are not the following vehicle 200R and the preceding vehicle 200F, and the own vehicle moving speed VO is between the economy vehicle moving speed upper limit VU_E and the economy vehicle moving speed lower limit VL_E (i.e., within the predetermined vehicle moving speed range RNG_E), the vehicle driving assist apparatus 10 proceeds with the process to the step 625. In this embodiment the predetermined vehicle moving speed range RNG_E is a range having the economy vehicle moving speed upper limit VU_E greater than the set vehicle moving speed V_SET by a predetermined value and the economy vehicle moving speed lower limit VL_E smaller than the set vehicle moving speed V_SET by a predetermined value.

At this time, the own vehicle moving speed VO is within the predetermined vehicle moving speed range RNG_E. Thus, when a moving mode is set to the coasting mode, and the coasting control is executed, the moving mode may be maintained at the coasting mode (i.e., the current moving mode may be unchanged) until the own vehicle moving speed VO becomes smaller than the economy vehicle moving speed lower limit VL_E. On the other hand, when the moving mode is set to the optimum accelerating mode, and the optimum acceleration control is executed, the moving mode may be maintained at the optimum accelerating mode (i.e., the current moving mode may be unchanged) until the own vehicle moving speed VO becomes greater than the economy vehicle moving speed upper limit VU_E. However, in this embodiment, the vehicle driving assist apparatus 10 sets the moving mode as described below.

For example, when the moving mode is set to the coasting mode, the coasting control is executed, and the own vehicle 100 coasts. In this case, the moving mode does not change to the optimum accelerating mode until the OV becomes smaller than the economy vehicle moving speed lower limit VL_E. Thus, the driver may feel that the moving speed of the own vehicle 100 is too small and thus, operate the accelerator pedal 41 to accelerate the own vehicle 100.

In this case, the driver requested driving torque DTQ_D_RQ calculated, based on the accelerator pedal operation amount AP may become greater than the system requested driving torque DTQ_S_RQ. In this case, the accelerator override state is determined to be produced, and the operations of the driving apparatus 21 are controlled, based on the driver requested driving torque DTQ_D_RQ. In this case, the first power source 211 may start to be operated. In this case, the first power source 211 may not be always operated at the optimum power output efficiency. Thus, the power output efficiency E of the driving apparatus 21 may be decreased.

Accordingly, when the vehicle driving assist apparatus 10 determines "No" at the step 615 and proceeds with the process to the step 625, the vehicle driving assist apparatus 10 determine whether an acceleration request condition is satisfied. The acceleration request condition is a condition that the accelerator override state is produced, and the first power source 211 will be operated to output the driving torque corresponding to the driver requested driving torque DTQ_D_RQ from the driving apparatus 21.

When the vehicle driving assist apparatus 10 determines "Yes" at the step 625, the vehicle driving assist apparatus 10 proceeds with the process to a step 630 to set the control mode to the optimum accelerating mode. Thereafter, the vehicle driving assist apparatus 10 executes processes of the steps 430 to 450 of the routine shown in FIG. 4 and then, proceeds with the process to the step 495 to terminate this routine once. Thereby, the optimum acceleration control is executed.

On the other hand, when the vehicle driving assist apparatus 10 determines "No" at the step 625 of the routine shown in FIG. 6, the vehicle driving assist apparatus 10 proceeds with the process to a step 635 to determine whether the accelerator override state is produced.

When the vehicle driving assist apparatus 10 determines "Yes" at the step 635, the vehicle driving assist apparatus 10 proceeds with the process to a step 640 to set the control mode to the ordinary moving mode. Thereafter, the vehicle driving assist apparatus 10 executes the processes of the steps 430 to 450 of the routine shown in FIG. 4 to execute the ordinary moving control and then, proceeds with the process to the step 495 to terminate this routine once. Thereby, the ordinary moving control is executed.

On the other hand, when the vehicle driving assist apparatus 10 determines "No" at the step 635, the vehicle driving assist apparatus 10 proceeds with the process to a step 645 to set the control mode to a mode previously set. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed.

As described above, in this embodiment, the acceleration request condition determined at the step 625 is the condition that the accelerator override state is produced, and the first power source 211 will be operated when the driving apparatus 21 is operated, based on the driver requested driving torque DTQ_D_RQ. In this regard, the acceleration request condition may be a condition that the accelerator override state is produced. In this case, when the vehicle driving assist apparatus 10 determines "Yes" at the step 625, the vehicle driving assist apparatus 10 proceeds with the process to the step 630 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. On the other hand, when the vehicle driving assist apparatus 10 determines "No" at the step 625, the vehicle driving assist apparatus 10 proceeds with the process directly to the step 645 to set the control mode to the mode previously set without executing a process of the step 635. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed. Thereby, the ordinary moving control is not executed. Thus, the power output efficiency is increased.

As can be understood from the processes of the steps 605 to 620 of the routine shown in FIG. 6 and the processes of the steps 430 to 450 of the routine shown in FIG. 4, executing these processes leads to executing the economy moving assist control to autonomously accelerate and decelerate the own vehicle 100 so as to maintain the own vehicle moving speed VO (i.e., the moving speed of the own vehicle 100) within the predetermined vehicle moving speed range RNG_E (i.e., the predetermined speed range).

Thus, the acceleration request condition determined at the step 625 substantially includes a condition that the economy moving assist control is executed, and the moving speed of the own vehicle 100 is within the predetermined speed range.

When the vehicle driving assist apparatus 10 determines "No" at the step 505 of the routine shown in FIG. 5, the vehicle driving assist apparatus 10 proceeds with the process to a step 510 to determine whether the forward inter-vehicle distance DF is greater than a forward middle distance determination value DF_M which is smaller than the preceding vehicle determination distance DF_TH. That is, when there is not the following vehicle 200R, but there is the preceding vehicle 200F, the vehicle driving assist apparatus 10 determines whether the forward inter-vehicle distance DF (i.e., the distance between the own vehicle 100 and the preceding vehicle 200F) is relatively great.

Figure 7:
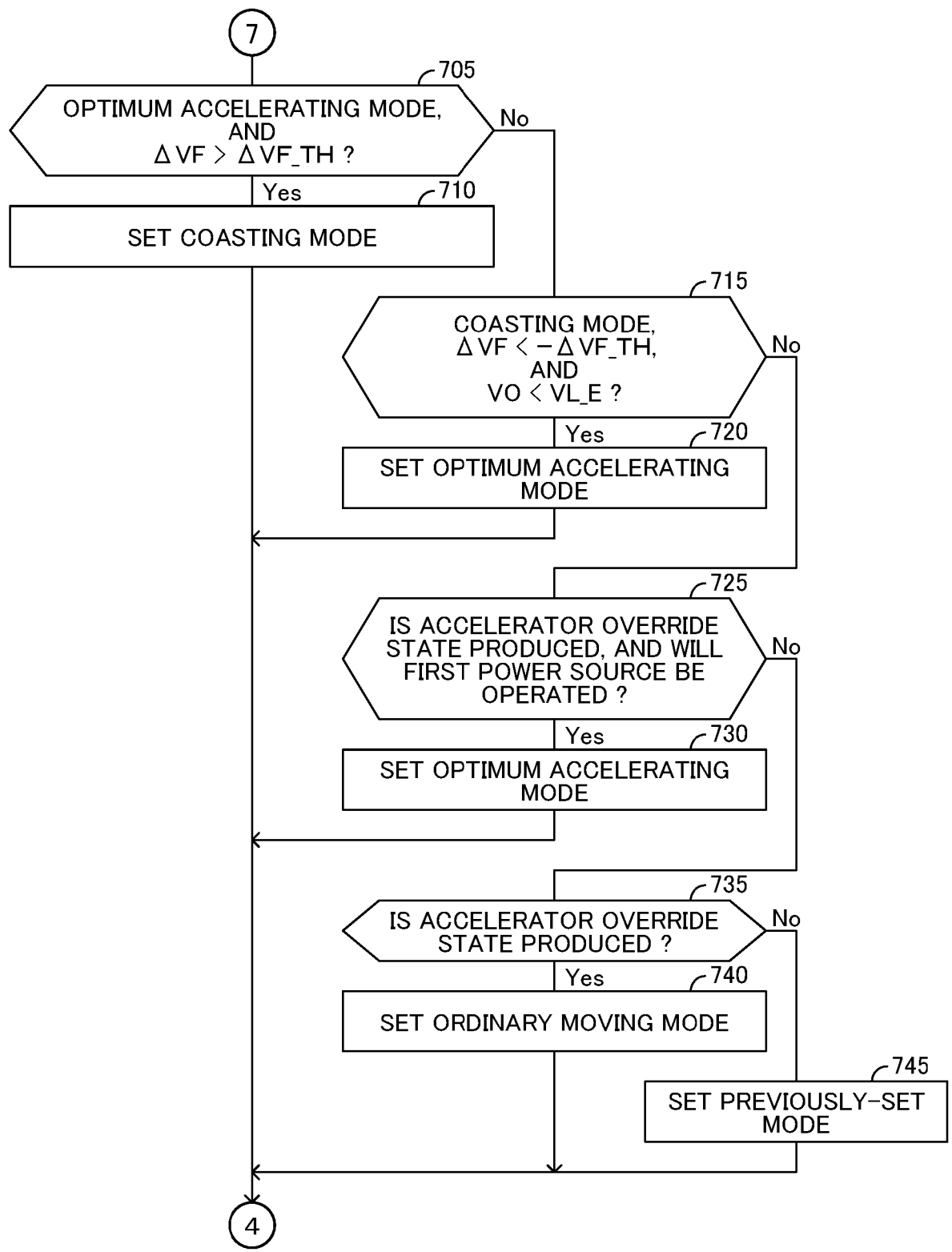
FIG. 7 is a view which shows a flowchart of a routine executed by the vehicle driving assist apparatus according to the embodiment of the invention.

When the vehicle driving assist apparatus 10 determines "Yes" at the step 510, the vehicle driving assist apparatus 10 proceeds with the process to a step 705 of a routine shown in FIG. 7 to determine whether the control move is set to the optimum accelerating mode, and a forward vehicle moving speed difference ΔVF is greater than a positive predetermined forward vehicle moving speed difference ΔVF_TH. The forward vehicle moving speed difference ΔVF is a difference of a preceding vehicle moving speed VF (i.e., the moving speed of the preceding vehicle 200F) with respect to the own vehicle moving speed VO (i.e., ΔVF=VO−VF). That is, when there is not the following vehicle 200R, but there is the preceding vehicle 200F, and the forward inter-vehicle distance DF (i.e., the distance between the own vehicle 100 and the preceding vehicle 200F) is relatively great, the own vehicle 100 is accelerated by the optimum acceleration control and thus, the own vehicle moving speed VO is greater than the moving speed of the preceding vehicle 200F. Thus, the vehicle driving assist apparatus 10 determines whether the own vehicle 100 is approaching the preceding vehicle 200F.

When the vehicle driving assist apparatus 10 determines "Yes" at the step 705, the vehicle driving assist apparatus 10 proceeds with the process to a step 710 to set the control mode to the coasting mode. Thereafter, the vehicle driving assist apparatus 10 executes the processes of the steps 430 to 450 of the routine shown in FIG. 4 and then, proceeds with the process to the step 495 to terminate this routine once. Thereby, the coasting control is executed. Thus, the own vehicle moving speed VO decreases.

On the other hand, when the vehicle driving assist apparatus 10 determines "No" at the step 705, the vehicle driving assist apparatus 10 proceeds with the process to a step 715 to determine whether (i) the control move is set to the coasting mode, (ii) the forward vehicle moving speed difference ΔVF is smaller than the negative predetermined forward vehicle moving speed difference ΔVF_TH, and (iii) the own vehicle moving speed VO is smaller than the economy vehicle moving speed lower limit VL_E. That is, when (i) there is not the following vehicle 200R, but there is the preceding vehicle 200F, (ii) the forward inter-vehicle distance DF (i.e., the distance between the own vehicle 100 and the preceding vehicle 200F) is relatively great, and (iii) the preceding vehicle 200F moves away from the own vehicle 100, the own vehicle 100 is decelerated by the coasting control and thus, the own vehicle moving speed VO is smaller than the preceding vehicle moving speed VF. Thus, the vehicle driving assist apparatus 10 determines whether the preceding vehicle 200F moves away from the own vehicle 100, and the own vehicle moving speed VO is smaller than the predetermined vehicle moving speed range RNG_E.

When the vehicle driving assist apparatus 10 determines "Yes" at the step 715, the vehicle driving assist apparatus 10 proceeds with the process to a step 720 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. Thus, the own vehicle 100 is accelerated.

On the other hand, when the vehicle driving assist apparatus 10 determines "No" at the step 715, the vehicle driving assist apparatus 10 proceeds with the process to a step 725 to determine whether the acceleration request condition is satisfied. The acceleration request condition is the condition that (i) the accelerator override state is produced, and (ii) the first power source 211 will be operated to output the driving torque corresponding to the driver requested driving torque DTQ_D_RQ from the driving apparatus 21.

When the vehicle driving assist apparatus 10 determines "Yes" at the step 725, the vehicle driving assist apparatus 10 proceeds with the process to a step 730 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. Thus, the own vehicle 100 is accelerated.

On the other hand, when the vehicle driving assist apparatus 10 determines "No" at the step 725 of the routine shown in FIG. 7, the vehicle driving assist apparatus 10 proceeds with the process to a step 735 to determine whether the accelerator override state is produced.

When the vehicle driving assist apparatus 10 determines "Yes" at the step 735, the vehicle driving assist apparatus 10 proceeds with the process to a step 740 to set the control mode to the ordinary moving mode. Thereafter, the vehicle driving assist apparatus 10 executes the processes of the steps 430 to 450 of the routine shown in FIG. 4 to execute the ordinary moving control and then, proceeds with the process to the step 495 to terminate this routine once. Thereby, the ordinary moving control is executed.

On the other hand, when the vehicle driving assist apparatus 10 determines "No" at the step 735, the vehicle driving assist apparatus 10 proceeds with the process to a step 745 to set the control mode to the mode previously set. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed.

As described above, in this embodiment, the acceleration request condition determined at the step 725 is the condition that (i) the accelerator override state is produced, and (ii) the first power source 211 will be operated when the driving apparatus 21 is operated, based on the driver requested driving torque DTQ_D_RQ. In this regard, the acceleration request condition may be the condition that the accelerator override state is produced. In this case, when the vehicle driving assist apparatus 10 determines "Yes" at the step 725, the vehicle driving assist apparatus 10 proceeds with the process to the step 730 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. On the other hand, when the vehicle driving assist apparatus 10 determines "No" at the step 725, the vehicle driving assist apparatus 10 proceeds with the process directly to the step 745 to set the control mode to the mode previously set without executing a process of the step 735. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed. Thereby, the ordinary moving control is not executed. Thus, the power output efficiency is increased.

As can be understood from (i) the processes of the step 510 of the routine shown in FIG. 5, (ii) the processes of the steps 705 to 720 of the routine shown in FIG. 7, and (iii) the processes of the steps 430 to 450 of the routine shown in FIG. 4, executing these processes leads to executing the economy moving assist control to autonomously accelerate and decelerate the own vehicle 100 so as to maintain the forward inter-vehicle distance DF (i.e., the distance between the own vehicle 100 and the preceding vehicle 200F) within a predetermined forward distance range (i.e., a limited range between the preceding vehicle determination distance DF_TH and the forward middle distance determination value DF_M).

Thus, the acceleration request condition determined at the step 625 substantially includes a condition that (i) the economy moving assist control is executed, and (ii) the distance between the own vehicle 100 and the preceding vehicle 200F is within the predetermined forward distance range.

Figure 9A:
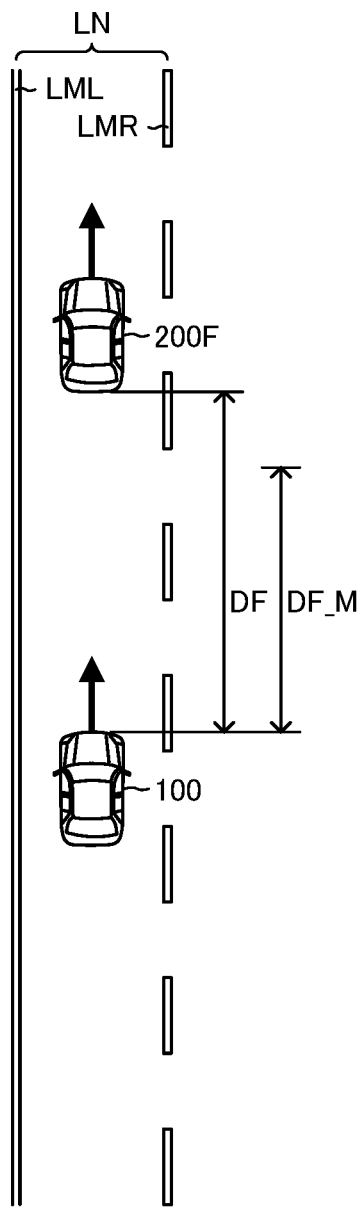
FIG. 9A is a view which shows a scene that the forward inter-vehicle distance is greater than a forward middle distance determination value.
Figure 9B:
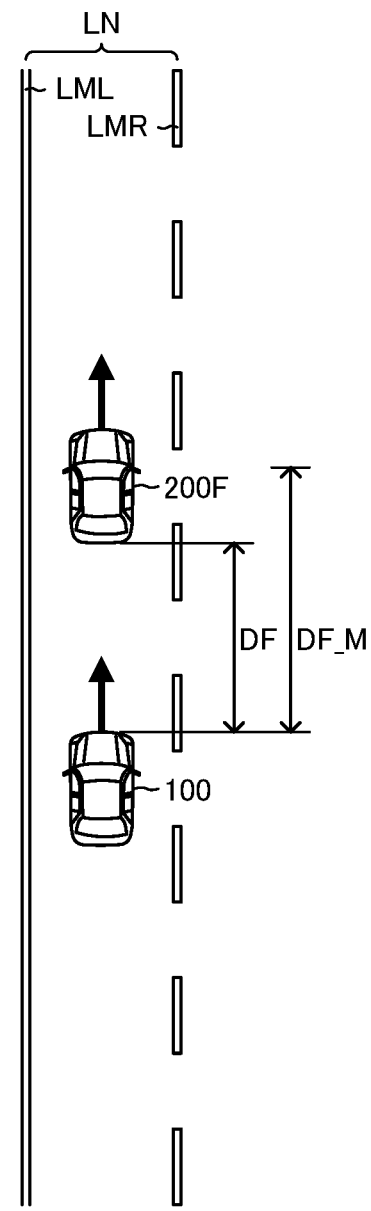
FIG. 9B is a view which shows a scene that the forward inter-vehicle distance is equal to or smaller than the forward middle distance determination value.

When the vehicle driving assist apparatus 10 determines "No" at the step 510 of the routine shown in FIG. 5, the vehicle driving assist apparatus 10 proceeds with the process to a step 515 to determine whether the forward inter-vehicle distance DF is greater than a forward short distance determination value DF_S which is smaller than the forward middle distance determination value DF_M. That is, when (i) there is not the following vehicle 200R, but there is the preceding vehicle 200F, and (ii) the distance between the own vehicle 100 and the preceding vehicle 200F is not relatively great as shown in FIG. 9B, the vehicle driving assist apparatus 10 determines whether the forward inter-vehicle distance DF (i.e., the distance between the own vehicle 100 and the preceding vehicle 200F) is not extremely small.

Figure 10A:
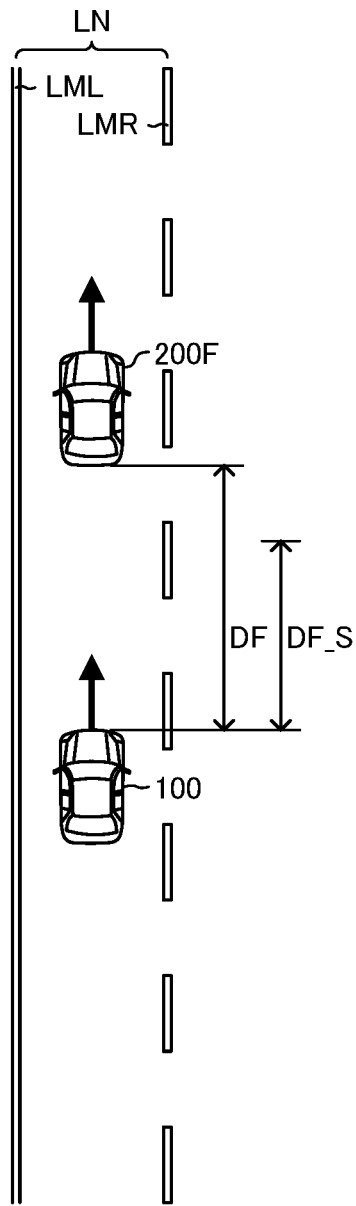
FIG. 10A is a view which shows a scene that the forward inter-vehicle distance is greater than a forward short distance determination value.
Figure 10B:
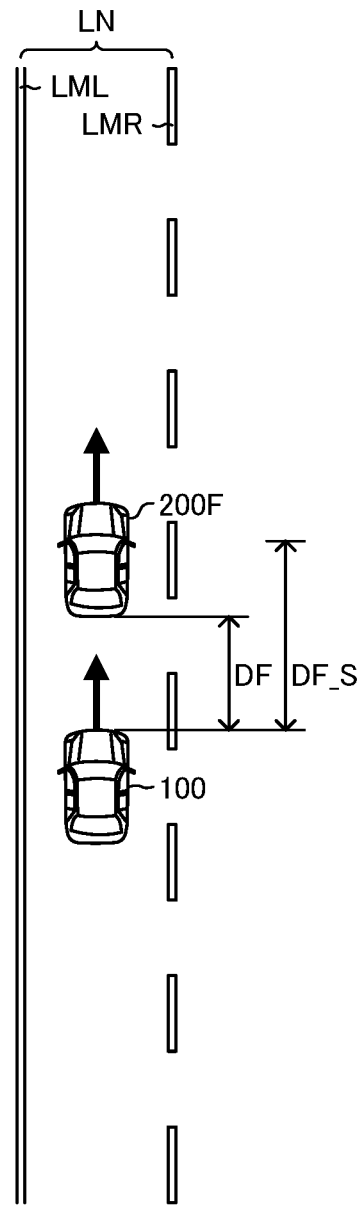
FIG. 10B is a view which shows a scene that the forward inter-vehicle distance is equal to or smaller than the forward short distance determination value.

When the vehicle driving assist apparatus 10 determines "Yes" at the step 515, the vehicle driving assist apparatus 10 proceeds with the process to a step 520 to set the control mode to the coasting mode. That is, when (i) there is not the following vehicle 200R, but there is the preceding vehicle 200F, (ii) the forward inter-vehicle distance DF (i.e., the distance between the own vehicle 100 and the preceding vehicle 200F) is not relatively great, and (iii) the forward inter-vehicle distance DF is not extremely small as shown in FIG. 10A, the vehicle driving assist apparatus 10 sets the control mode to the coasting mode. Thereafter, the vehicle driving assist apparatus 10 executes the processes of the steps 430 to 450 of the routine shown in FIG. 4 and then, proceeds with the process to the step 495 to terminate this routine once. Thereby, the coasting control is executed. Thus, the own vehicle 100 is decelerated.

On the other hand, when the vehicle driving assist apparatus 10 determines "No" at the step 515 of the routine shown in FIG. 5, the vehicle driving assist apparatus 10 proceeds with the process to a step 525 to set the control mode to the inter-vehicle distance maintaining mode. That is, when (i) there is not the following vehicle 200R, but there is the preceding vehicle 200F, and (ii) the distance between the own vehicle 100 and the preceding vehicle 200F is extremely small, the vehicle driving assist apparatus 10 sets the control mode to the inter-vehicle distance maintaining mode. Thereafter, the vehicle driving assist apparatus 10 executes the processes of the steps 430 to 450 of the routine shown in FIG. 4 and then, proceeds with the process to the step 495 to terminate this routine once. Thereby, the ordinary following moving control is executed.

When the vehicle driving assist apparatus 10 determines "No" at the step 415 of the routine shown in FIG. 4, the vehicle driving assist apparatus 10 proceeds with the process to a step 420 to determine whether the forward inter-vehicle distance DF is greater than the preceding vehicle determination value DF_TH. That is, when (i) the moving assist execution condition and the economy moving execution condition are both satisfied, and (ii) there is the following vehicle 200R, the vehicle driving assist apparatus 10 determines whether there is the preceding vehicle 200F.

Figure 8:
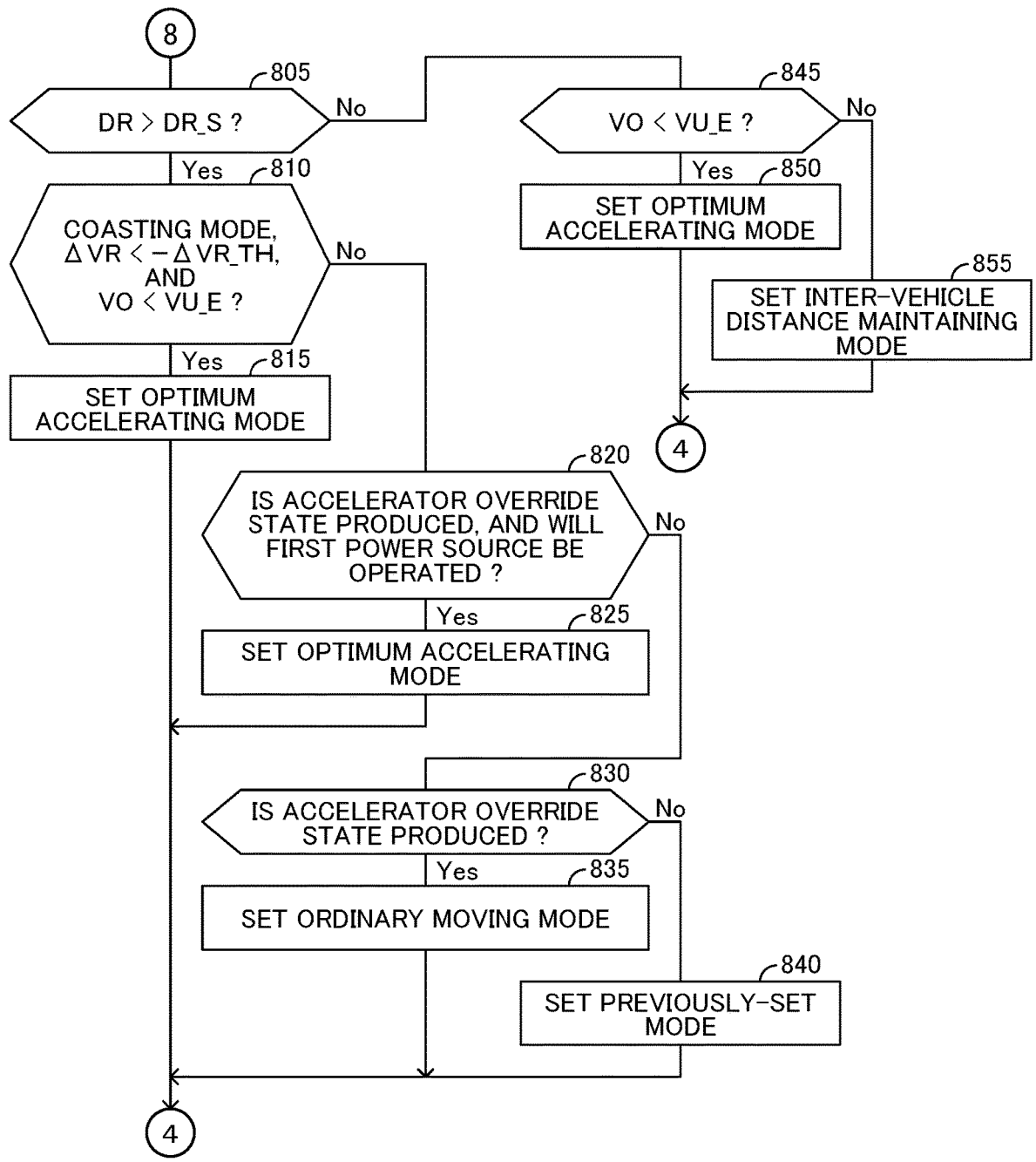
FIG. 8 is a view which shows a flowchart of a routine executed by the vehicle driving assist apparatus according to the embodiment of the invention.

When the vehicle driving assist apparatus 10 determines "Yes" at the step 420, the vehicle driving assist apparatus 10 proceeds with the process to a step 805 of the routine shown in FIG. 8 to determine whether the rearward inter-vehicle distance DR is greater than a rearward short distance determination value DR_S which is smaller than the following vehicle determination value DR_TH. That is, when there is the following vehicle 200R, but there is not the preceding vehicle 200F, the vehicle driving assist apparatus 10 determines whether the following vehicle 200R is extremely near the own vehicle 100.

Figure 11A:
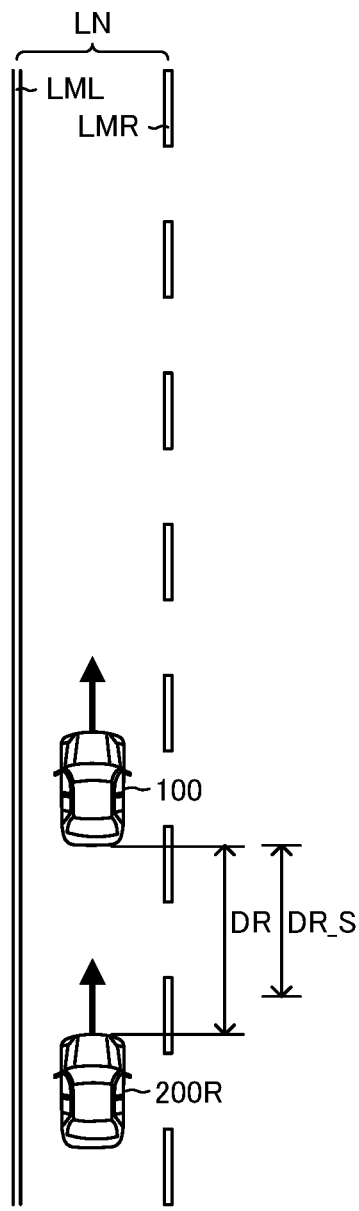
FIG. 11A is a view which shows a scene that the rearward inter-vehicle distance is greater than a rearward short distance determination value.

When the vehicle driving assist apparatus 10 determines "Yes" at the step 805, the vehicle driving assist apparatus 10 proceeds with the process to a step 810 to determine whether (i) the control mode is set to the coasting mode, (ii) a following vehicle moving speed difference ΔVR is a negative predetermined following vehicle moving speed difference ΔVR_TH, and (iii) the own vehicle moving speed VO is smaller than the economy vehicle moving speed upper limit VU_E. The following vehicle moving speed difference ΔVR is a difference of a following vehicle moving speed VR with respect to the own vehicle moving speed VO (ΔVR=VO−VR). The following vehicle moving speed VR is the moving speed of the following vehicle 200R. That is, when (i) there is the following vehicle 200R, but there is not the preceding vehicle 200F, and (ii) the following vehicle 200R is not extremely near the own vehicle 100 as shown in FIG. 11A, the own vehicle 100 is decelerated by the coasting control, and the own vehicle moving speed VO is smaller than the following vehicle moving speed VR. Thus, the vehicle driving assist apparatus 10 determines whether (i) the following vehicle 200R is approaching the own vehicle 100, and (ii) the own vehicle moving speed VO is greater than the predetermined vehicle moving speed range RNG_E.

When the vehicle driving assist apparatus 10 determines "Yes" at the step 810, the vehicle driving assist apparatus 10 proceeds with the process to a step 815 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. Thus, the own vehicle 100 is accelerated.

On the other hand, when the vehicle driving assist apparatus 10 determines "No" at the step 810, the vehicle driving assist apparatus 10 proceeds with the process to a step 820 to determine whether the acceleration request condition is satisfied. The acceleration request condition is the condition that (i) the accelerator override state is produced, and (ii) the first power source 211 will be operated to output the driving torque corresponding to the driver requested driving torque DTQ_D_RQ from the driving apparatus 21.

When the vehicle driving assist apparatus 10 determines "Yes" at the step 820, the vehicle driving assist apparatus 10 proceeds with the process to a step 825 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. Thus, the own vehicle 100 is accelerated.

On the other hand, when the vehicle driving assist apparatus 10 determines "No" at the step 820 of the routine shown in FIG. 8, the vehicle driving assist apparatus 10 proceeds with the process to a step 830 to determine whether the accelerator override state is produced.

When the vehicle driving assist apparatus 10 determines "Yes" at the step 830, the vehicle driving assist apparatus 10 proceeds with the process to a step 835 to set the control mode to the ordinary moving mode. Thereafter, the vehicle driving assist apparatus 10 executes the processes of the steps 430 to 450 of the routine shown in FIG. 4 to execute the ordinary moving control and then, proceeds with the process to the step 495 to terminate this routine once. Thereby, the ordinary moving control is executed.

On the other hand, when the vehicle driving assist apparatus 10 determines "No" at the step 830, the vehicle driving assist apparatus 10 proceeds with the process to a step 840 to set the control mode to the mode previously set. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed.

As described above, in this embodiment, the acceleration request condition determined at the step 820 is the condition that (i) the accelerator override state is produced, and (ii) the first power source 211 will be operated when the driving apparatus 21 is operated, based on the driver requested driving torque DTQ_D_RQ. In this regard, the acceleration request condition may be the condition that the accelerator override state is produced. In this case, when the vehicle driving assist apparatus 10 determines "Yes" at the step 820, the vehicle driving assist apparatus 10 proceeds with the process to the step 825 to set the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once. Thereby, the optimum acceleration control is executed. On the other hand, when the vehicle driving assist apparatus 10 determines "No" at the step 820, the vehicle driving assist apparatus 10 proceeds with the process directly to the step 840 to set the control mode to the mode previously set without executing a process of the step 830. That is, the vehicle driving assist apparatus 10 maintains the current control mode. Thereafter, the vehicle driving assist apparatus 10 executes the processes of the steps 430 to 450 of the routine shown in FIG. 4 and then, proceeds with the process to the step 495 to terminate this routine once. Thereby, when the coasting control is executed, the coasting control continues to be executed, and when the optimum acceleration control is executed, the optimum acceleration control continues to be executed. Thereby, the ordinary moving control is not executed. Thus, the power output efficiency is increased.

As can be understood from the processes of the processes of the steps 805 to 815 of the routine shown in FIG. 8, and the processes of the steps 430 to 450 of the routine shown in FIG. 4, executing these processes leads to executing the economy moving assist control to autonomously accelerate and decelerate the own vehicle 100 so as to maintain the rearward inter-vehicle distance DR (i.e., the distance between the own vehicle 100 and the following vehicle 200R) within a predetermined rearward distance range (i.e., a limited range between the following vehicle determination value DR_TH and the rearward short distance determination value DR_S).

Thus, the acceleration request condition determined at the step 820 substantially includes a condition that (i) the economy moving assist control is executed, and (ii) the distance between the own vehicle 100 and the following vehicle 200R is within the predetermined rearward distance range.

Figure 11B:
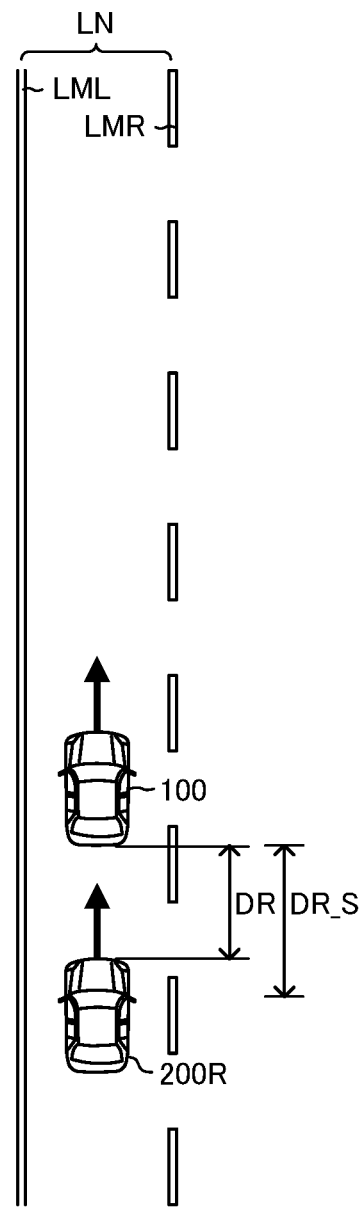
FIG. 11B is a view which shows a scene that the rearward inter-vehicle distance is equal to or smaller than the rearward short distance determination value.

When the vehicle driving assist apparatus 10 determines "No" at the step 805 of the routine shown in FIG. 8, the vehicle driving assist apparatus 10 proceeds with the process to a step 845 to determine whether the own vehicle moving speed VO is smaller than the economy vehicle moving speed upper limit VU_E. That is, when (i) there is not the following vehicle 200R, but there is the preceding vehicle 200F, and (ii) the following vehicle 200R is extremely near the own vehicle 100 as shown in FIG. 11B, the vehicle driving assist apparatus 10 determines whether the own vehicle moving speed VO is smaller than the economy vehicle moving speed upper limit VU_E.

When the vehicle driving assist apparatus 10 determines "Yes" at the step 845, the vehicle driving assist apparatus 10 proceeds with the process to a step 850 to set the control mode to the optimum accelerating mode. That is, when (i) there is the following vehicle 200R, but there is not the preceding vehicle 200F, (ii) the following vehicle 200R is not extremely near the own vehicle 100, and (iii) the own vehicle moving speed VO is smaller than the economy vehicle moving speed upper limit VU_E, the vehicle driving assist apparatus 10 sets the control mode to the optimum accelerating mode. Thereafter, the vehicle driving assist apparatus 10 executes the processes of the steps 430 to 450 of the routine shown in FIG. 4 and then, proceeds with the process to the step 495 to terminate this routine once.

Thereby, the optimum acceleration control is executed. Thus, the own vehicle 100 is accelerated.

On the other hand, when the vehicle driving assist apparatus 10 determines "No" at the step 845 of the routine shown in FIG. 8, the vehicle driving assist apparatus 10 proceeds with the process to a step 855 to set the control mode to the inter-vehicle distance maintaining mode. That is, when (i) there is the following vehicle 200R, but there is not the preceding vehicle 200F, (ii) the following vehicle 200R is not extremely near the own vehicle 100, and (iii) the own vehicle moving speed VO is greater than the predetermined vehicle moving speed range RNG_E, the vehicle driving assist apparatus 10 sets the control mode to the inter-vehicle distance maintaining mode. Thereafter, the vehicle driving assist apparatus 10 executes the processes of the steps 430 to 450 of the routine shown in FIG. 4 and then, proceeds with the process to the step 495 to terminate this routine once. Thereby, the ordinary constant speed moving control is executed.

When the vehicle driving assist apparatus 10 determines "Yes" at the step 420 of the routine shown in FIG. 4, the vehicle driving assist apparatus 10 proceeds with the process to a step 425 to set the control mode to the inter-vehicle distance maintaining mode. That is, when there are the following vehicle 200R and the preceding vehicle 200F, the vehicle driving assist apparatus 10 sets the control mode to the inter-vehicle distance maintaining mode. Thereafter, the vehicle driving assist apparatus 10 executes the processes of the steps 430 to 450 of the routine shown in FIG. 4 and then, proceeds with the process to the step 495 to terminate this routine once. Thus, the ordinary following moving control is executed.

<Advantages>

With the vehicle driving assist apparatus 10 described above, when the accelerator override state is produced while the economy moving assist control is executed, the ordinary moving control does not start to be executed promptly, but the economy moving assist control continues to be executed. Thereby, the power output efficiency of the driving apparatus 21 for moving the own vehicle 100 can be maintained at the great efficiency.

It should be noted that the invention is not limited to the aforementioned embodiments, and various modifications can be employed within the scope of the invention.

What is claimed is:

1. A vehicle driving assist apparatus comprising an electronic control unit configured to execute an ordinary moving assist control and an economy moving assist control,
the ordinary moving assist control being a control to autonomously accelerate and decelerate an own vehicle so as to maintain a moving speed of the own vehicle at a set speed, or maintain a distance between the own vehicle and a preceding vehicle which moves ahead of the own vehicle at a set distance,
the economy moving assist control being a control to autonomously accelerate and decelerate the own vehicle so as to maintain the moving speed of the own vehicle within a predetermined speed range, or maintain the distance between the own vehicle and the preceding vehicle within a predetermined forward distance range,
the electronic control unit being configured to:
while the economy moving assist control is executed,
execute (i) a coasting control to decelerate the own vehicle by causing the own vehicle to coast and (ii) an optimum acceleration control to accelerate the own vehicle by controlling operations of a driving apparatus of the own vehicle at a power output efficiency of the driving apparatus equal to or greater than a predetermined efficiency; and
while the ordinary moving assist control is executed,
stop the ordinary moving assist control and execute an ordinary moving control to accelerate the own vehicle, based on an accelerator pedal operation amount when an accelerator override state is produced due to an operation of an accelerator pedal of the own vehicle,
wherein the electronic control unit is configured to accelerate the own vehicle by the optimum acceleration control when an acceleration request condition, during the accelerator override state, is satisfied while the economy moving assist control is executed.

2. The vehicle driving assist apparatus as set forth in claim 1, wherein the acceleration request condition includes a condition that the moving speed of the own vehicle is within the predetermined speed range.

3. The vehicle driving assist apparatus as set forth in claim 1, wherein the acceleration request condition includes a condition that the distance between the own vehicle and the preceding vehicle is within the predetermined forward distance range.

4. The vehicle driving assist apparatus as set forth in claim 1,
wherein the electronic control unit is configured to maintain a distance between the own vehicle and a following vehicle which moves behind the own vehicle within a predetermined rearward distance range by the economy moving assist control, and
wherein the acceleration request condition includes a condition that the distance between the own vehicle and the following vehicle is within the predetermined rearward distance range.

5. The vehicle driving assist apparatus as set forth in claim 1,
wherein two power sources having different power output properties are installed on the own vehicle,
wherein the electronic control unit is configured to stop operating at least one of the power sources when the coasting control is executed, and
wherein the acceleration request condition includes a condition that the unoperated power source will be operated when the own vehicle is accelerated by the ordinary moving control, based on the accelerator pedal operation amount.

6. A vehicle driving assist method comprising steps of:
executing an ordinary moving assist control to autonomously accelerate and decelerate an own vehicle so as to maintain a moving speed of the own vehicle at a set speed, or maintain a distance between the own vehicle and a preceding vehicle which moves ahead of the own vehicle at a set distance;
executing an economy moving assist control to autonomously accelerate and decelerate the own vehicle so as to maintain the moving speed of the own vehicle within a predetermined speed range, or maintain the distance between the own vehicle and the preceding vehicle within a predetermined forward distance range;
while the economy moving assist control is executed,
executing a coasting control to decelerate the own vehicle by causing the own vehicle to coast and an optimum acceleration control to accelerate the own vehicle by controlling operations of a driving apparatus of the own vehicle at a power output efficiency of the driving apparatus equal to or greater than a predetermined efficiency;

while the ordinary moving assist control is executed,
stopping the ordinary moving assist control and executing an ordinary moving control to accelerate the own vehicle, based on an accelerator pedal operation amount when an accelerator override state is produced due to an operation of an accelerator pedal of the own vehicle; and accelerating the own vehicle by the optimum acceleration control when an acceleration request condition, during the accelerator override state, is satisfied while the economy moving assist control is executed.

7. A non-transitory computer readable storage medium storing a vehicle driving assist program configured to:
   execute an ordinary moving assist control to autonomously accelerate and decelerate an own vehicle so as to maintain a moving speed of the own vehicle at a set speed, or maintain a distance between the own vehicle and a preceding vehicle which moves ahead of the own vehicle at a set distance;
   execute an economy moving assist control to autonomously accelerate and decelerate the own vehicle so as to maintain the moving speed of the own vehicle within a predetermined speed range, or maintain the distance between the own vehicle and the preceding vehicle within a predetermined forward distance range;
   while the economy moving assist control is executed,
      execute a coasting control to decelerate the own vehicle by causing the own vehicle to coast and an optimum acceleration control to accelerate the own vehicle by controlling operations of a driving apparatus of the own vehicle at a power output efficiency of the driving apparatus equal to or greater than a predetermined efficiency;
   while the ordinary moving assist control is executed,
      stop the ordinary moving assist control and execute an ordinary moving control to accelerate the own vehicle, based on an accelerator pedal operation amount when an accelerator override state is produced due to an operation of an accelerator pedal of the own vehicle; and
   accelerate the own vehicle by the optimum acceleration control when an acceleration request condition during the accelerator override state, is satisfied while the economy moving assist control is executed.

8. A vehicle comprising the vehicle driving assist apparatus as set forth in claim 1.

9. A vehicle comprising a vehicle driving assist apparatus executing the vehicle driving assist method as set forth in claim 6.

10. A vehicle comprising a vehicle driving assist apparatus executing the vehicle driving assist program as set forth in claim 7.

* * * * *